US007526494B2

(12) United States Patent
Rom et al.

(10) Patent No.: US 7,526,494 B2
(45) Date of Patent: *Apr. 28, 2009

(54) SYSTEM AND METHOD FOR USER CREATION AND DIRECTION OF A RICH-CONTENT LIFE-CYCLE

(75) Inventors: Raul Rom, Spring, TX (US); Krzysztof Klucyzk, Katy, TX (US); Jerry J. Johnson, Crosby, TX (US)

(73) Assignee: ePlus Systems, Inc, Herndon, VA (US)

( * ) Notice: Subject to any disclaimer, the term of this patent is extended or adjusted under 35 U.S.C. 154(b) by 356 days.

This patent is subject to a terminal disclaimer.

(21) Appl. No.: 11/062,631

(22) Filed: Feb. 23, 2005

(65) Prior Publication Data

US 2005/0193029 A1 Sep. 1, 2005

Related U.S. Application Data

(60) Provisional application No. 60/547,882, filed on Feb. 27, 2004.

(51) Int. Cl.
*G07F 17/30* (2006.01)
*G06F 15/16* (2006.01)

(52) U.S. Cl. .................................... 707/100; 707/104.1

(58) Field of Classification Search ................. 707/100, 707/104.1
See application file for complete search history.

(56) References Cited

U.S. PATENT DOCUMENTS

2002/0083067 A1 * 6/2002 Tamayo et al. .............. 707/100
2003/0028451 A1 * 2/2003 Ananian ....................... 705/27
2003/0033191 A1 * 2/2003 Davies et al. ................. 705/10

* cited by examiner

*Primary Examiner*—John E Breene
*Assistant Examiner*—Alex Gofman
(74) *Attorney, Agent, or Firm*—Stephen Gigante; Cha & Reiter, LLC

(57) ABSTRACT

A system and method are disclosed for creating, controlling and enhancing a life-cycle of at least one stage for a rich-content repository, such as a catalog of products and services. The item data is received from a source and is processed in accordance with a User-defined life-cycle, finally being published/syndicated as rich-content. At User direction, the rich-content life-cycle can include one or more stages such as item data receipt from a supplier, transformation under control of User-defined functions, and publication/syndication of the transformed, i.e., rich-content data. Maintenance of rich-content repositories is likewise provided using a User-defined life-cycle having User-defined functions.

19 Claims, 33 Drawing Sheets

SYSTEM AND METHOD FOR USER CREATION AND DIRECTION OF A RICH-CONTENT LIFE-CYCLE

RELATED APPLICATION

This Application claims the benefit of U.S. Provisional Application No. 60/547,881 filed on Feb. 27, 2004, which is hereby incorporated by reference in its entirety.

BACKGROUND OF THE INVENTION

1. Field of the Invention

The present invention relates to a system and method for User control of a life-cycle for rich-content data items. More particularly, the present invention relates to a system and method for User creation and direction of a life-cycle for rich-content data items. Most particularly, the present invention relates to a system and method for User creation and direction of a capture through publication and syndication life-cycle for rich-content data items.

2. Description of the Related Art

The term 'rich-content' refers to basic data that is enhanced and extended (i.e., "enriched") to become the "information" that is required to support knowledge-based decisions and actions by different types of Users. For suppliers, transforming basic product-item data into the format and structure required of standards-based e-catalogs enables them to make their data available to more potential customers—thus "enriching" its value to the supplier. The customer wants to use familiar terms to search for and compare different products from different suppliers prior to selecting ones that best fit their needs. The customer's task is greatly simplified when the items have been "enriched" to support their decision making—i.e., items from different suppliers have been classified into similar groups, item descriptions and other data elements essential to searching and comparing have been standardized, user-familiar synonyms and product-brand-to-manufacturer links have been established to facilitate finding like items, and current images have been added to show the product. The catalog administrators are tasked with maintaining the catalog. The administrators need tools that facilitate their ability to "enrich" the content by making it complete, accurate and current. Tools that facilitate the administrators tasks include: global update functions, data transformation templates that can be re-used for data imports and exports, wizards that simplify pattern matching rule development, and links to external systems to obtain real-time pricing.

As described above, the term "rich-content" has a multi-dimensional nature. The information in each dimension has been upgraded, enhanced, or enriched, beyond the basic data, to better enable different "Users" to carry out their tasks—i.e., supplying, using, maintaining—related to the information.

An example of rich-content is the enhanced content of a set of one or more catalogs of products and services associated with a supply chain. This set of catalogs comprises a rich-content repository that identifies and describes what is available from the suppliers participating in the supply chain, how it is available (some purchasers want to buy only from certain vendors), defines equivalents for what is available (generics for drugs), etc.

Rich-content is created and maintained using a life-cycle model comprising a set of pre-determined stages having a pre-determined ordering. A user can include all the Users associated with the rich-content life-cycle, including owners, suppliers, buyers, sellers, and publishers, i.e., any rich-content data source and sink.

Typically, a subject matter expert developing rich-content catalogs and repositories has to personally review incoming or outgoing data records and manually make the complex changes to these data records that are needed to meet various pre-determined information processing requirements. Input data records comprise low level data that is not coded, organized or formatted to support decision-making. Rich-content results when these input data records are converted into higher level information that is coded, organized, and formatted to support decision-making. This conversion is critical to the effective use of the resulting rich-content information by users, for example, by all the users involved in a supply chain process. This ability to capture and automate the use of the subject matter expert's domain knowledge is essential to the cost effective development, use, and ongoing management of rich-content catalogs and repositories.

When the subject matter expert has to perform conversion tasks manually it is time and resource intensive, it often leads to poor data quality, and it is costly for all concerned. The quality of catalog content directly impacts the effectiveness of buy and sell-side processes and related data processing applications, as well as traditional enterprise resource planning (ERP) systems. The information stored within a catalog is only useful if it can be found and can be related to internal data processing programs and the enterprise's policies and procedures. If content is of poor quality, end-Users (buyers) tend to not use their rich-content systems and resort to maverick (i.e., off-contract) spending (in the case of a procurement application). In such a scenario, any benefits of price discounts, strategic sourcing, vendor contract compliance, vendor performance measurement, and other cost savings of ownership are lost. Furthermore, the accuracy of an enterprise's financial reporting and financial statements can be impaired by the miss-categorization of fixed assets, consumables, services, or other categories of information.

Typical rich-content systems use a fixed life-cycle to manage the process of (1) obtaining data from disparate supplier sources and (2) creating therefrom a rich-content repository that can be used throughout an enterprise and not just as an e-catalog that supports an e-commerce platform. That is, systems exist having fixed life-cycles for providing an e-catalog of rich-content that synergizes with sellers' and buyers' business practices. However, the Users of such systems do not have any direct control over how the rich-content synergizes with their business practices. One of the most critical components of any purchasing or selling process, or online or e-business strategy is the electronic catalog of products and services utilized for buy and sell side applications, sourcing, and inventory control and ERP systems. If items are not represented properly in an electronic catalog, any system employing the catalog can be rendered useless and frustrate Users. Therefore, User-defined customization of rich-content data definition and synergy with business practices is critical to meeting supplier, end-User, customer, and marketplace requirements for both internal processing and external, competitive standards.

By way of example only and not in any limiting sense, a typical rich-content repository is an e-catalog. The typical e-catalog system comprises a fixed method or life-cycle for building a rich-content e-catalog of products and their vendors. The input data describing each product and at least one associated vendor/supplier is provided by one or more product suppliers in many industries and can be in many different legacy formats. A typical life-cycle for a rich-content repository can include one or more phases or stages devoted to creation, classification, standardization, maintenance, and publication. One system, disclosed in co-pending U.S. patent application Ser. No. 10/705,923 to Johnson, et al., which is hereby incorporated by reference as if fully set forth herein, uses a knowledge base of patterns for categorizing goods and services into families described by a common language generator or CLG. The method by Johnson et al. may include at least one step for aggregating the syntax and semantics of at least one product supplier's database, data, and administration processes and at least one step for transforming the aggregated items into a normalized form or pattern. These normalized forms or patterns are then used by at least one further step to define, populate, and administer the e-catalog database created from source data from at least this one product supplier's legacy database(s). The life-cycle of an e-catalog taught by Johnson et al. is fixed, providing no direct User control. User provided descriptions of products and services are analyzed for common patterns (contained in the knowledge base), normalized (standardized) in accordance with the rules of the knowledge base and then added to the e-catalog.

A typical e-catalog system provides Users with a fixed life-cycle system for creating and maintaining a rich-content repository. A typical life-cycle, as illustrated in FIG. 1A, comprises a fixed-order series of pre-determined processing stages and Users of the system are associated with at least one of these life-cycle stages:

1. Data Aggregation 118—consists of importing 100, standardizing 101 and validating 102 (1) incoming content data and (2) schema files and their inclusion as appendages to specified branches of an existing schema, as well as (3) historical data from accounting and procurement systems. Historical data may be processed for strategic spending analysis, vendor contract compliance, scope analysis, and to develop business processes, policies and procedures relating to both the e-catalog system as well as internally to the User's enterprise.

Incoming content 100 may be received in different electronic formats and file types as well as non-electronic form. Such non-electronic form may include paper catalogs, datasheets, material data safety sheets, etc. 2. Rich-content creation 116—includes multiple successive activities: Schema Definition 104, Item Classification 105, Pattern Building and Value-extraction 106, and Quality Assurance 107 and includes manual additions and modifications to items, definition of synonyms, definition of accessory information, and the association of items across different schemas.

2. Data Transformation 124—comprises using and extending a referencing schema 104 of categories for enabling classification of rich-content data items. Usually, These categories comprise classes and sub-classes in a parent-child relationship structure. Data items are categorized within respective classes or subclasses based on their features/properties. These features/properties are termed "Attributes".

3. Catalog Administration 123 and Publishing 125—comprises definition and maintenance of critical administrative information. This administration information typically includes User and Group profiling 119, price markup definition 121, product view definition 120, authorizations, formatting, syntax, and other attributes as may be required by Users or enterprises. The catalogs can be "Published" 109 to a Catalog Browser Web Application 112 or any electronic data processing system which can accept such data, or can be "Syndicated" 111 to Users and customers, or can be viewed in various electronic and paper reports and analyses.

Some rich-content systems synergize with systems through the use a workflow engine to allow a rich-content publisher's authorized personnel to approve any changes made on rich-content items and re-publish or syndicate the changes.

4. Catalog Maintenance 113—comprises definition and management of rich-content items within an already published rich-content repository. Rich-content items can be added or existing items can be modified or deleted. Items are moved, copied and associated across different schema locations in a variety of specified different ways.

5. Catalog Browser WEB Application 112—comprises browsing and navigation of published rich-content repositories. Shoppers use the published rich-content repository to purchase available items or request quotes for non-available items.

6. Data Syndication 111—comprises exporting of rich-content to customers in different file formats. The rich-content repository is wholly or partially exported in a format specified by the User.

Existing systems provide almost no control of the structure and content of the rich-content life-cycle, which is fixed by a publisher of the rich-content.

SUMMARY OF THE INVENTION

Thus, there is a need for a customizable end-to-end or life-cycle system and method, which Users dynamically customize and functionally enhance and then employ to create and manage a rich-content repository of product/supplier data of the highest possible quality. The present invention provides such a system and method in which Users can adapt to and reflect the descriptive nuances of products available from individual suppliers. The life-cycle system and method of the present invention relates rich-content to industry standards and to supplier and buyer business practices, in order to provide a satisfactory search in a procurement setting. In the life-cycle of a system and method according to the present invention, a User finds what is wanted, is able to compare (1) attributes, (2) vendor terms and conditions, (3) prices, (4) availability, (5) options, and (6) replacement parts, to verify contract terms and conditions as well as all other details related to the product or vendor, and to verify that the goals of a procuring organization are not compromised.

In the present invention the term User includes all the users associated with a rich-content life-cycle, including:

- Owners—the people who own the information being managed;
- Suppliers—the people providing the information;
- Buyers—the people using the information to select, compare, learn about and act upon (i.e., purchase preferred items) the information;
- Sellers—the people selling items to buyers;
- Publishers; the people exporting product item information to others for various uses
- Contributors of content: a supplier, broker, marketplace;
- Approving organizations—i.e., ones certifying content readiness;
- Data pools/information exchanges/content hubs—e.g., UCCnet, an organization that takes in catalog information from suppliers, transforms it into standards-based formats, and then sends it to catalog administrators who use it to sell to the catalog administrators' customers
- Distributors—who send catalog contents to their customers who then administer the catalog;
- Web site publishers—who get the catalog from a rich-content catalog source and make it available on their web site for customers, wherein, a publisher can utilize several such web sites to publish their catalogs to different markets;

Providers of outsourced services to a sourcing company, or content suppliers/aggregators; and Enterprise synchronizers—e.g., a company with many databases wants to synchronize their data among multiple ERP systems in a common database—for various uses, such as a data warehouse, or to facilitate data mining.

The present invention provides a system and method for a User to define and thereafter control a rich-content life-cycle comprising at least one stage having an associated standard set of functions and when a plurality of stages are defined it includes a User-specified ordering of the plurality of stages. In a preferred embodiment a User is provided with a default life-cycle having a plurality of stages and an ordering. However, the system and method of the present invention enables the User to customize this default life-cycle by deleting and adding stages and by reordering the stages. In the present invention the provided stages may include at least the following stages:

providing language and structure infrastructure, including
 i. a common language for defining a standard schema, and
 ii. providing a standard database structure defined using the standard schema using the provided common language;

importing a content file having at least one of an incoming raw content file including an item file structure having at least one incoming item, and an incoming schema file defining the incoming raw content file;

determining at least one difference between the incoming content file and the standard database as a delta analysis;

value-added mapping of the imported raw content file according to the provided standard schema and the determined delta analysis; and publishing the mapped content as a content-rich repository.

The present invention also provides at least one User-defined function that extends the associated standard set of functions of the at least one life-cycle stage. That is, in addition to a User-defined life-cycle having at least one stage, the system and method of the present invention provides the capability for definition of additional User-defined functions associated with each life-cycle stage. These additional User-defined functions are for capturing subject matter expert intelligence and implementing the dynamic customizations that are required by rich-content Users. These capabilities are needed for facilitating conversion of "data" into "actionable information" and responses to the continuous data modifications that are required to meet ever-changing requirements for receiving, using, and syndicating rich-content.

These User-defined capabilities include User-directed "smart fields", hierarchical relationships, User-directed global changes, real time User-adaptive pricing, collaborated and dynamic hot lists, User-defined marketplaces via punch-out access, User-directed contract compliance monitoring, global level pattern matching rules, exception reporting, User-selected composite data field creation and highlighted mandatory class attributes.

These User-defined capabilities allow a User to select data manipulation decisions that have to be made, to easily direct a rich-content system to make these complex data manipulations automatically, and to define stages to include notification of the User on an "exception basis" when further manual intervention is needed.

The system and method of the present invention applies to the typical e-catalog rich-content repository management system outlined above, but is not limited to enhancing just that type of system. It also applies to other systems that deal with rich-content, including rich-content based catalog systems.

User-defined customizations of rich-content data, based on the use of subject matter expert domain knowledge, is critical to meeting supplier, end-user, customer, and marketplace requirements for both internal processing and external, competitive standards. As indicated above, the present invention provides User-defined customization of imported and exported rich-content data items through the use of User driven "smart fields", hierarchical relationships, global changes, real time adaptive pricing, collaborated and dynamic hot lists, punch out marketplace access, contract compliance monitoring, global level pattern matching rules, exception reporting, and composite data field creation. That is, the system and method of the present invention includes the following capabilities and applies to any content system, but preferably a rich-content system:

1. User-defined "smart fields" are provided in a content system and method to intelligently and dynamically control the rich-content life-cycle of inputting, processing and outputting rich-content information that requires unique treatment. The smart fields implement User-defined rules that define fields that are mandatory, field data types, fields that are interdependent with the values in other fields, default values for empty but required fields, and fields that require validation. To ensure field value validation, the smart fields force entered data to match User-controlled meta-data field values. To implement field value conditionality, the smart fields utilize an "expression builder" to dynamically determine computed input values for User-defined fields. This aspect of smart fields enables the User to integrate into a simple or complex expression: the values in already defined or standard fields, string or numeric constants, and the basic numeric functions (+−*/). The smart field expression can be used to dynamically manage field-related events, values and relationships, including: creating a desired field value, modifying a field attribute, establishing field interdependencies, triggering event notifications to selected uses, and sending process control messages to workflows.

2. One or more hierarchical relationships are defined between items in a rich-content repository, for example, a parent child relationship between a manufacturer and one or more sub-brands.

3. User-directed global changes to fields are provided for fields that share similar characteristics, for example, making global price changes (i.e., marking them up or down by a User-selected percent) to items that shared common pricing.

4. Viewing real-time, User-adapted pricing for selected items is provided. For example, if User-based pricing rules for selected catalog items are contained in an external system (i.e., an external ERP system), when the User selects a catalog item, the system and method of the present invention connects to the external system, obtains the User-based pricing, and presents it to the User as part of the item information that was pulled from the rich-content repository.

5. Working dynamically with other Users on the development of a "collaborated hot list" is provided. For example, selected Users from different departments who are responsible for providing new employees with their initial supplies, can asynchronously access the shared hot list, and add, modify or delete items as needed to keep the "new hire" hot list current and accurate.

6. Access to a "User-defined marketplace" is provided within the context of the purchasing process. For example, the User can "punch out" to User selected external rich-content repository sites and select rich-content items from those sites. These items are placed in the User's internal shopping cart, along with items from internal or external repositories. The shopping cart is then routed through an appropriate approval process.

7. Monitoring vendor/User directed contract compliance is provided. For example, the User inputs vendor contract rules related to pricing, volume purchasing, discount time ranges, etc. The system compares the pricing of selected items to the contract rules, and notifies the User if item pricing does not comply with the contracted rules, i.e., the current purchase price is greater than the contracted pricing.

8. Refinement of item classification and item retrieval is provided by a function to subdivide generated class patterns by attribute name. This function allows Users to apply Global Level pattern matching rules (a library of Patterns) that are common to all types of rich-content items that share at least one characteristic. As an example, where size is described as a fractional number or a decimal Users may "Call" all existing fractional size patterns stored in the system to read the incoming data as non standardized input and find the correlating size within the descriptive text information and interpret it and create a standardized output based on the global level pattern. This function mitigates two main issues Users face in data standardization. First, the repetitive processes of finding data elements and converting them to a standard are captured as knowledge-based pattern matching rules that can be reused. Second, the function imposes standardization across multiple rich-content items that facilitates the comparison of cross matching items from multiple sources.

9. Creation of a "dynamic hot list" is provided by saving items in a shopping cart that represent purchases that will be repeated. When the saved list is re-accessed, the items are checked for changes since the list was last saved. The changes are noted. The User can also add or delete items from the saved list.

10. Data quality control is provided on an exception management basis. For example, the User can view a report of items not meeting predefined mandatory requirements, or a report that identifies changes to external schemas that have been mapped to internal schemas.

11. The length and make-up of User-selected composite data fields can be customized. For example, the User can select the length of the composite field, identify the other fields that are to be combined to make up the composite, determine the sequence in which these fields are combined, select whether a field's abbreviation or its full data will be used in the composite, and manually edit the composite before it is saved and/or exported (original)

12. Whenever an item is created, edited or in quality control, mandatory attributes will be highlighted. This User-alert indicates which items are mandatory. To facilitate quality assurance, an Items Missing Attribute Values option will be added. It will allow the User to view and download items missing attribute values.

An owner or a third-party can host a rich-content repository built using the system and method of the present invention. This hosting can be accomplished such that businesses participating in an ePlatform comprising the rich-content repository are able to use the rich-content repository to support their business functions, e.g., accounting and production functions, while sending clear and concise information about their products and services into virtually any channel desired. The ePlatform comprising a rich-content system built using the present invention synergizes with User business processes, policies, procedures and practices. In the system and method of the present invention such synergy is accomplished by providing at least one of a standard and a User-defined capability for:

Access to rich-content data throughout the production, accounting, customer service and marketing functions of a User (buyer, seller, and owner) organization;

Support for Market Place standards (ROSETTANET, cXML, XML, EDI, etc.); and for industry norms for formatting, categorizing, searching, purchase order descriptions, and design description, that is, data and images together provide intuitive transaction support so Users see a familiar description and image;

Linking rich-content to supporting information such as images, usage tables, Material Safety Data Sheets (MSDS) and attachments; and Cross-referencing rich-content using UNSPSC, UPC and other standards.

A typical ePlatform comprising a rich-content system according to the present invention can also provide a private marketplace that can be tailored to specific buyer needs, allowing contracted items/prices in separated views within the same marketplace, which reduces maverick buying (unauthorized purchases of products/services including products/services not included in the rich-content system).

Finally, a User may access the system and method of the present invention from any interactive user interface, such as a wireless device (personal digital assistant or even a cell phone), or via a network such as the Internet. And, the system and method of the present invention may be hosted in a variety of ways, e.g., standalone system with wired and wireless User interactive interface devices as well as a plurality of federated servers accessible over a network from wired and wireless User interactive interface devices. The federated servers may or may not be physically co-located. The rich-content repositories may be resident on any suitable architecture including centralized databases and replicated, distributed databases accessible over any type of network. The User of a system and method according to the present invention is able to create and manage a rich-content repository anywhere, anytime, by using any device that can support an interactive user interface that has wired or wireless access to a system hosting the system and method of the present invention.

BRIEF DESCRIPTION OF THE DRAWINGS

FIG. 20 illustrates a navigation screen that enables a User to select at least one site to punchout to;

DETAILED DESCRIPTION OF PREFERRED EMBODIMENT

Figure 1A:
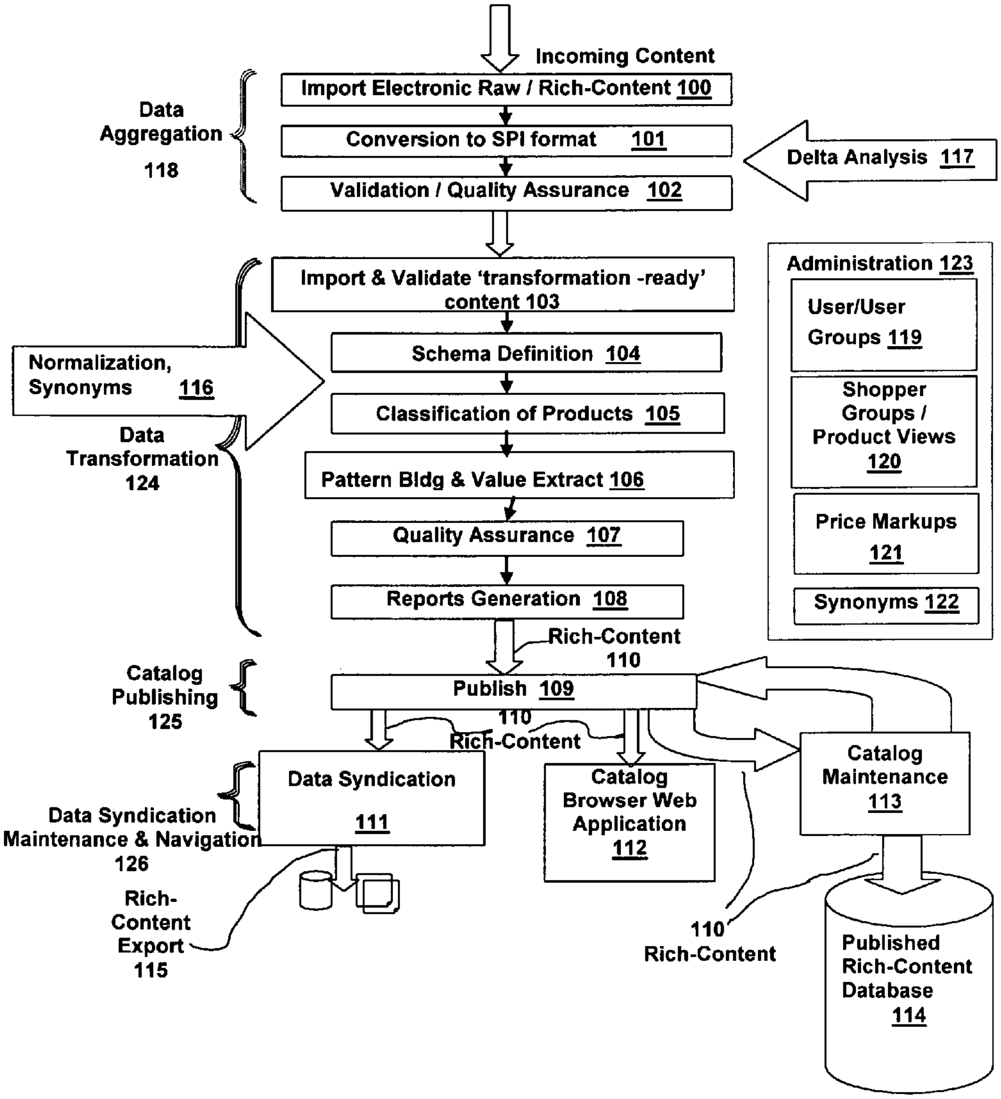
FIG. 1A illustrates a typical lifecycle for rich-content.

The present invention is a system and method for User definition and direction of a rich-content life-cycle by selecting at least one stage from a group consisting of at least one pre-defined stage and enhancing the functionality of the selected stage by selecting at least one function from a group consisting of at least one pre-defined function.

In a preferred embodiment, a life-cycle of rich-content starts with raw product item data, and includes at least one of the of the following steps

- Defining at least one schema for organizing the data;
- Importing the data into a holding place for data cleaning and enhancing;
- Using pattern-matching rules to map the data into the defined at least one schema;
- Cleaning the data to remove unwanted elements;
- Transforming the data into standardized formats and representations;
- Adding meta data that facilitates the future access to, and relevance of, the data;

- Adding related additional information such as images, synonyms, and hierarchical brand-manufacturer relationships;
- Implementing User-defined fields to describe the items in ways that are unique to each User group;
- Routing content input and changes to selected approvers to ensure content quality;
- Creating, storing and reusing templates to facilitate the transformation of imported data to meet the rich-content requirements of internal applications;
- Creating, storing and reusing templates to facilitate the transformation, publication and syndication of exported data to meet the requirements of external applications and standards based systems;
- Maintaining the completeness, accuracy and timeliness of information in a rich-content repository via the use of tools such as global updating of selected records and real-time price presentation;
- Managing the system security and access rights through control of User and group profiles; and
- Removing rich-content items when they are no longer needed.

Syndication is the ability to create catalogs or groups of items from the rich content database that will be used by external applications or processes as the source data for Upload and use by the external application, typical uses are eProcurement system that require internal hosted data, ERP item master data, Sourcing, using the rich Item Data in a spreadsheet to distribute the information for competitive bidding from suppliers.

Publication is related to the approved changes to items (adds, Deletes, Changes) within the eCommerce (navigator shopping environment) catalog, where the system either thru, batch (user Trigger) or automatic incremental (system Setting) processes update the published C+ catalog with changes after the Approval or Change Management process.

Preferred embodiments of the present invention differ from typical, content management approaches that require the User to follow a provided, pre-defined life-cycle process in a lock-step manner. By contrast, preferred embodiments of the present invention provide a suggested or default route through stages of a life-cycle, but also enable the User to define the path of stages that best fits the User's situation. The User is free to customize use of the system and method of the present invention to establish a User-defined life-cycle for a rich-content repository or the User can follow the suggested life-cycle. That is, the user can tailor the suggested life-cycle by skipping steps, doing steps out of "order", repeating steps, customizing steps or even adding new steps that the User has developed. Or, the User can follow the suggested or default life-cycle as-is.

The customizes steps and defines new steps using User-defined functions comprising:

User-Defined Smart Fields

User-defined "smart fields" are available to a User in every life-cycle stage requiring User input via a smart field in a screen. These smart fields are actually rules associated with the smart fields that allow the User to add intelligence to all data inputs to facilitate a high degree of personalizaiton and customization of input, processing and output of rich-content data items. That is, smart fields are fields appearing in screens that are extended with User-defined rules that direct components of a rich-content system in the processing of data that is entered into the field. The rules apply to data that is entered manually or imported from a data file.

The smart field rules allow the User to designate:

whether a field must be entered (i.e., it is mandatory) or it may be left blank (i.e., it is optional);

the data type of the field—i.e., String, Integer, True/False, Decimal or Date; and whether the data entered in the field is:

unrestricted—no rules are applied to verify the data entry conditional—User-defined rules are applied to the field and/or related fields—ie—if field "A" has a value, then field "B" is mandatory; or if field "A" has a value meeting a variable based on an expression then field "B" is mandatory or not mandatory based on the expression. The rules are built with an "expression builder" that eanbles the User to dynamically create a field value from an expression built from the integration of field types (existing, standard or User-defined), string or numeric constants, and basic functions (i.e., +−*/).

Requires validation—the field is filled with the meta data that is pre-assigned by the User to ensure that the field meets desired standards. Validated fields are treated as mandatory. Meta data field labels and values are specified by the User, and associated with a User-defined field. When a User-defined field requires validation, the value of the meta data associated with that field is used as the field's data value. This automatic allocation of the meta data value ensures that the "validated" fields contain desired data values.

The User-defined fields, with their smart field capability, enable the User to transform uniquely structured rich-content repositories into fixed structures required by standardized schemas, e.g., UCCNet. UCC stands for Uniform Code Council, and UCCNet is the commercial data exchange organization.

The smart fields also facilitate the management and process flow for data to be delivered to external systems.

Once specified, the User-defined data elements can be added, modified, or deleted.

Once a Data standard is developed within the system, the standard can be saved as a reusable Standards template. The desired Standards template can then be selected during system setup to enable Users to conform to the desired Data standard.

Figure 1B:
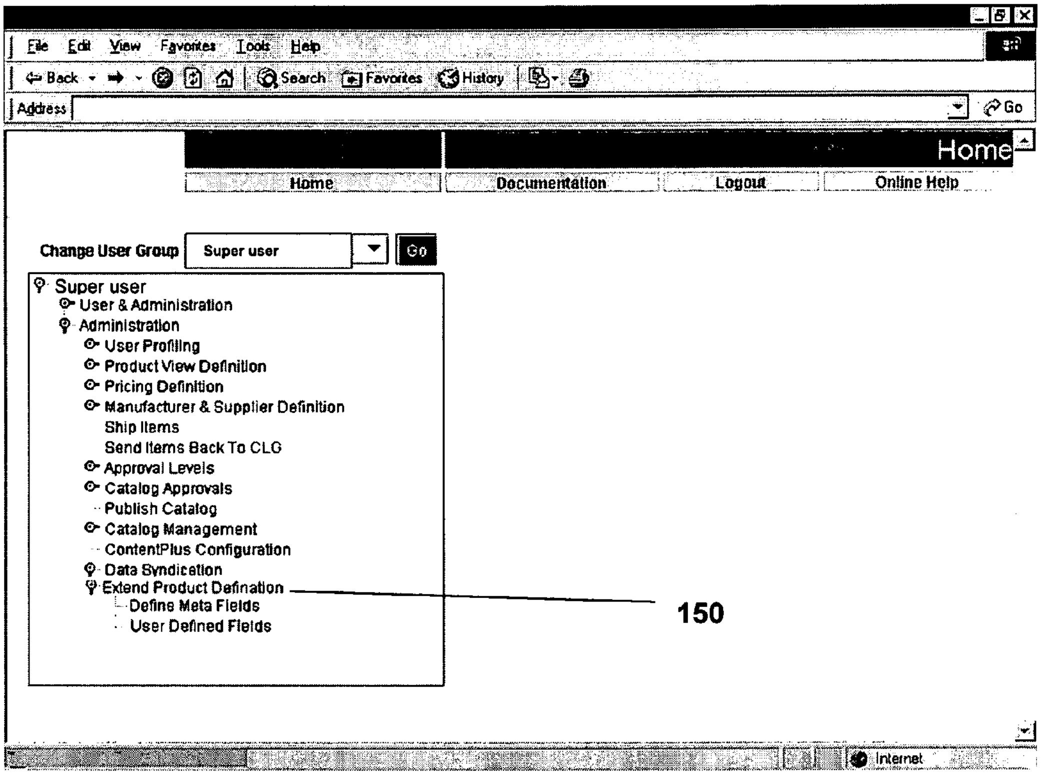
FIG. 1B illustrates using a main menu screen for extending a product definition using User-defined fields.
Figure 2:
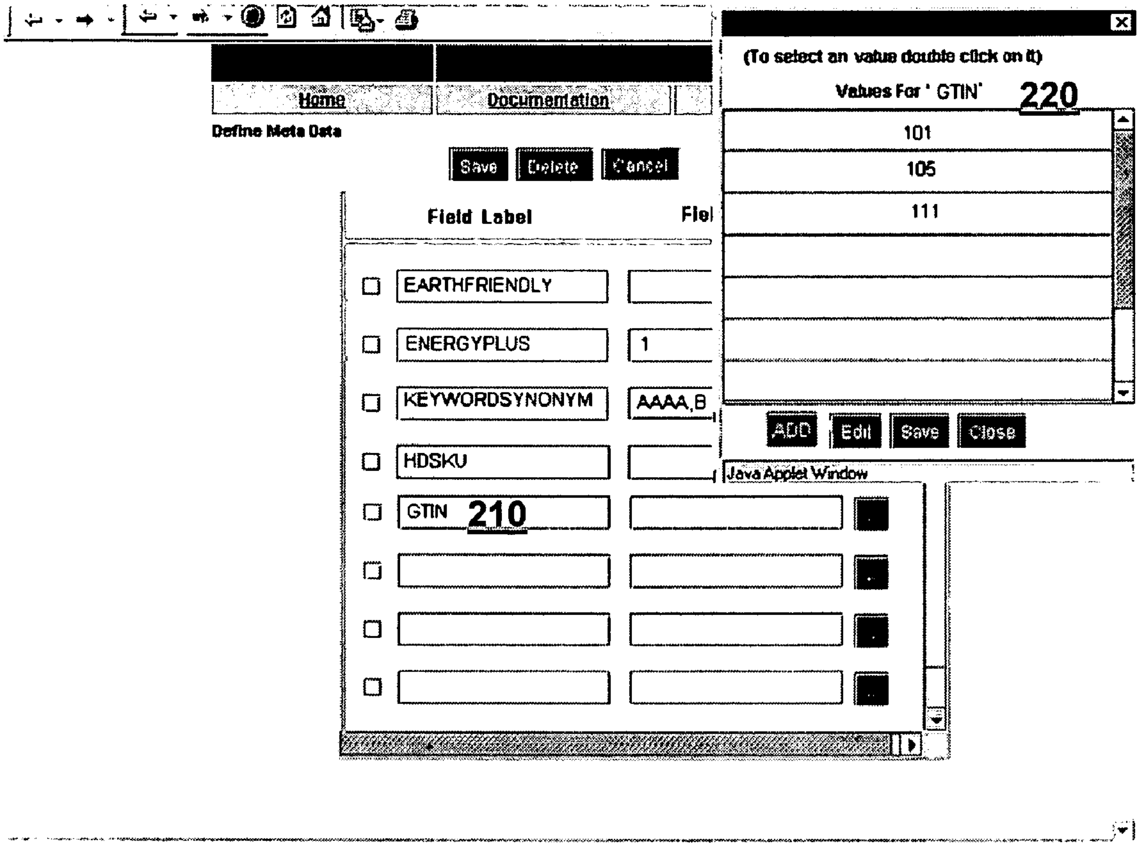
FIG. 2 illustrates a screen for specifying meta data fields and assigning meta data values.
Figure 3:
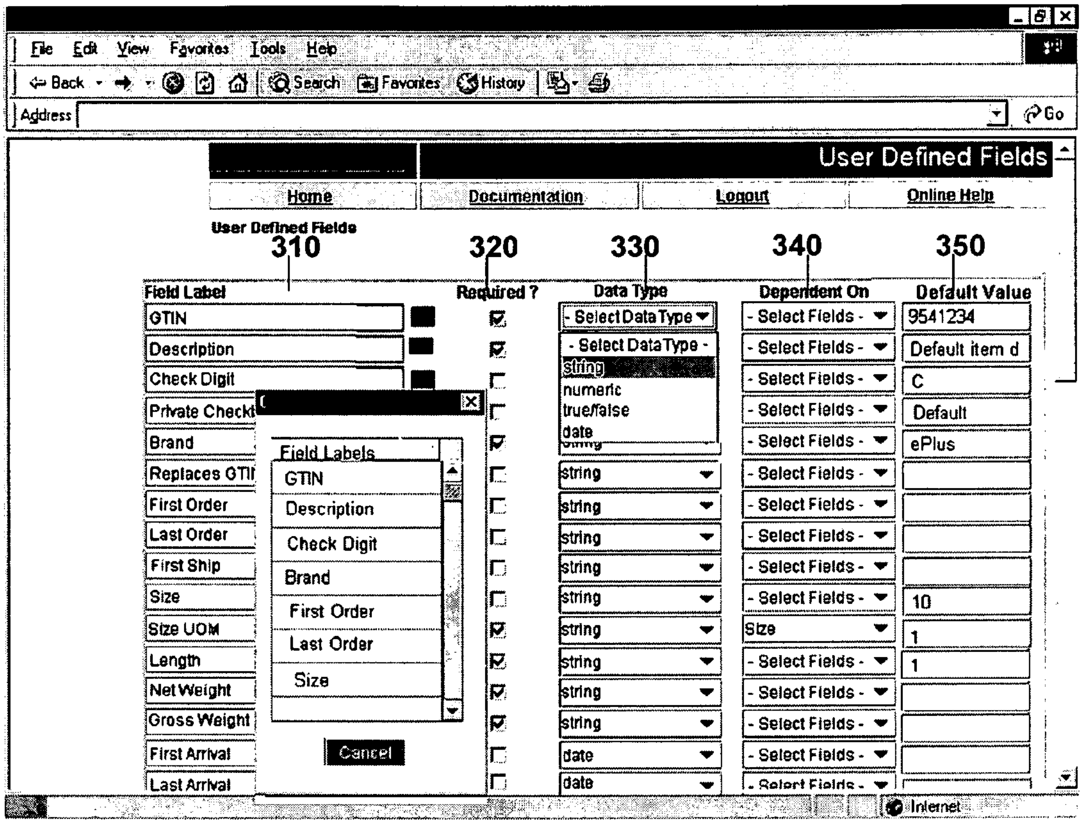
FIG. 3 illustrates a screen for specifying User-defined fields.

FIG. 1B illustrates a screen for a User to extend the product definition 110 by defining meta data fields (see FIG. 2), for managing User-defined fields (see FIG. 3). FIG. 2 illustrates a screen in which meta data fields are labeled 210, and values are assigned 220. There can be more than one value assigned to a meta data label 220. The User can choose, from the approved meta data values, the one value that best fits the requirements of the specific field to be validated during rich-content creation and maintenance.

FIG. 3 illustrates a screen for specifying User-defined fields. The User labels a field 310, specifies whether or not the field is required 320 (i.e., mandatory), specifies a data type for the field 330, identifies field(s) that the field is dependent upon 340, and enters a default value for the field 350. The default value can be a constant or it can be dynamically created based on an expression built with an expression builder (an expression builder is an example of a pre-defined function included in the system and method of the present invention). The default value is inserted into that field for an item that does not have its own value. The default value can be overwritten by the User. Once the field is specified, the User can save the information or cancel and exit the screen.

Figure 4:
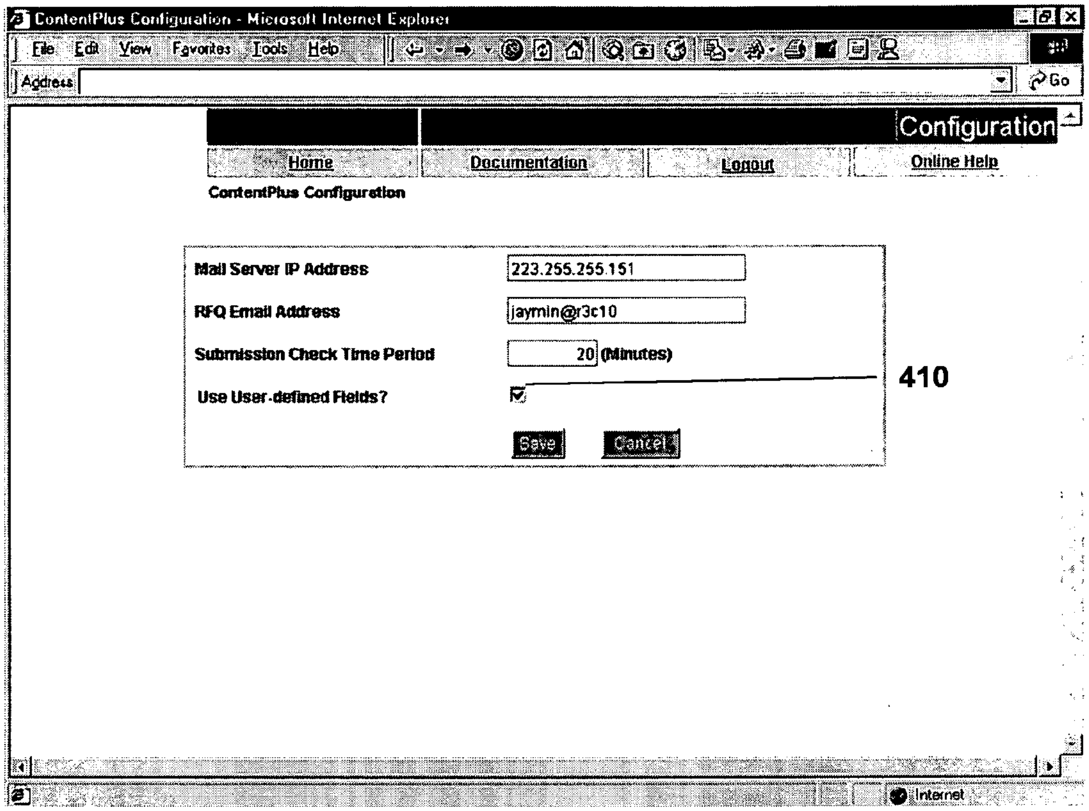
FIG. 4 illustrates a screen for toggling on or off User-defined fields.

FIG. 4 illustrates a screen for the presentation and use of the User-defined fields, which can be turned on, or off by checking the "use User-defined fields" box 410.

Figure 5:
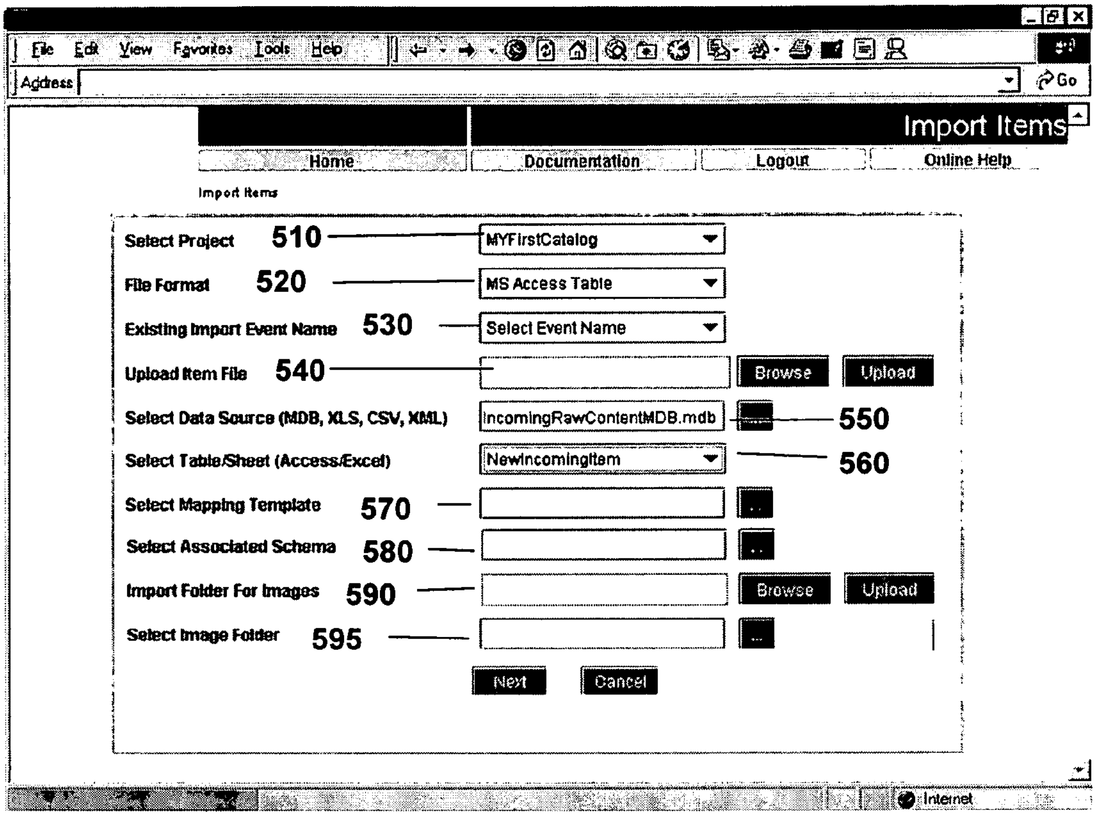
FIG. 5 illustrates a screen for setting up the import of an external data item file.

FIG. 5 illustrates a screen having fields required for setting up a process for importing an external data file into the system for subsequent data cleaning, transformation and storage. This involves selecting:

a project name 510;

a file format 520;

an existing import event name 530;

a file to be imported 540, a file data source type (i.e., XML, CVS, XLS) 550;

a file table or sheet name if the file source is Access or Excel 560);

a mapping template 570;

an associated schema 580;

an import folder as a source for any images 590 to be imported; and a folder for storing the images 595.

That is, the User defines the life-cycle process from import to file storage.

Figure 6:
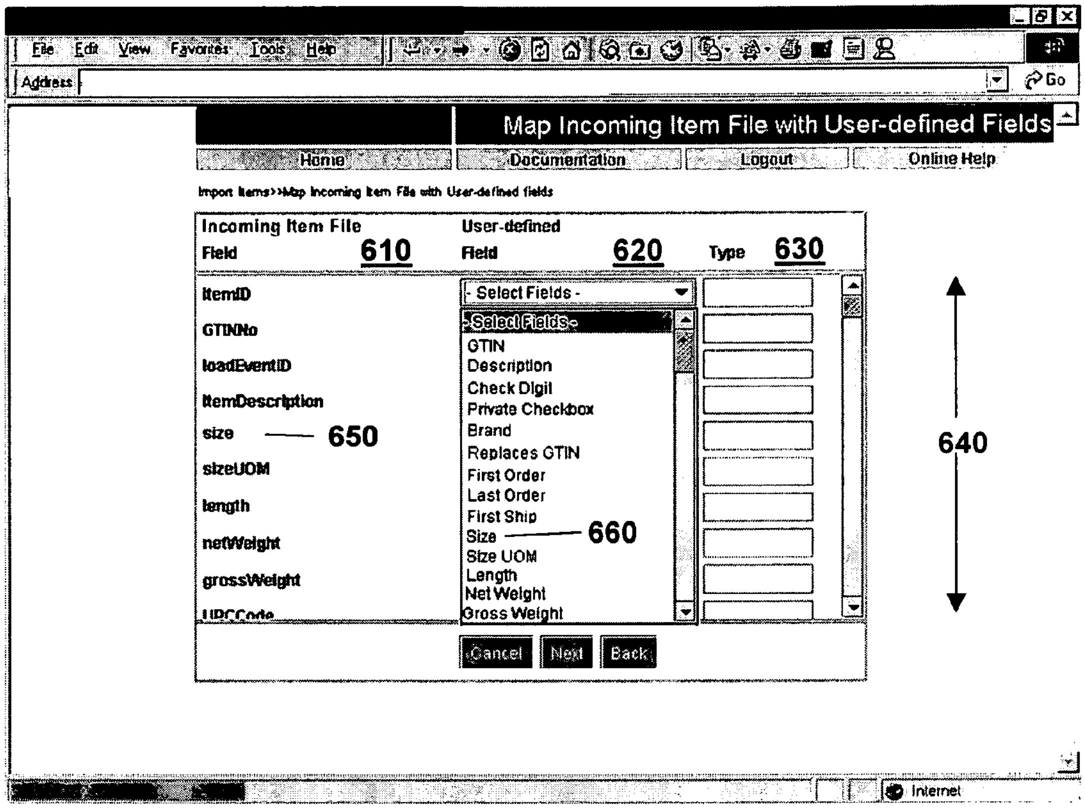
FIG. 6 illustrates a screen for mapping imported items to User-defined fields.

FIG. 6 illustrates a screen for mapping item fields of an incoming file 610 to corresponding User-defined fields 620, and identifying a field type for each of the User defined fields 630. For example, the field "Item Size" 650 in the incoming item file is linked to the User-defined field "Size" 660.

Once the mapping rules are specified, the "template" 640 can be saved and reused, e.g., the next time a similar file is to be imported.

When mapping a User-defined template, the User is required to map all the mandatory User-defined fields. During data import, the template is employed to convert imported data elements into at least one desired schema and format, and to store the converted data in the User's rich-content repository. If there is no data in an imported file field and a default value for the field has been specified, then that field is assigned the default value. If no default value has been specified and the field is mandatory, then the User is alerted and the items that failed during the import process are placed on a "rework" list for the User to review and take some action. Items requiring rework are displayed for the User to edit. The rework error is highlighted, and the User is able to correct the error. The approved meta data values for fields that require validation are presented for selection by the User. All modifications to the data are submitted for approval before the modifications are committed to the rich-content repository. Items in the rework list are not included in syndication outputs, i.e., they are not published or exported.

Figure 7:
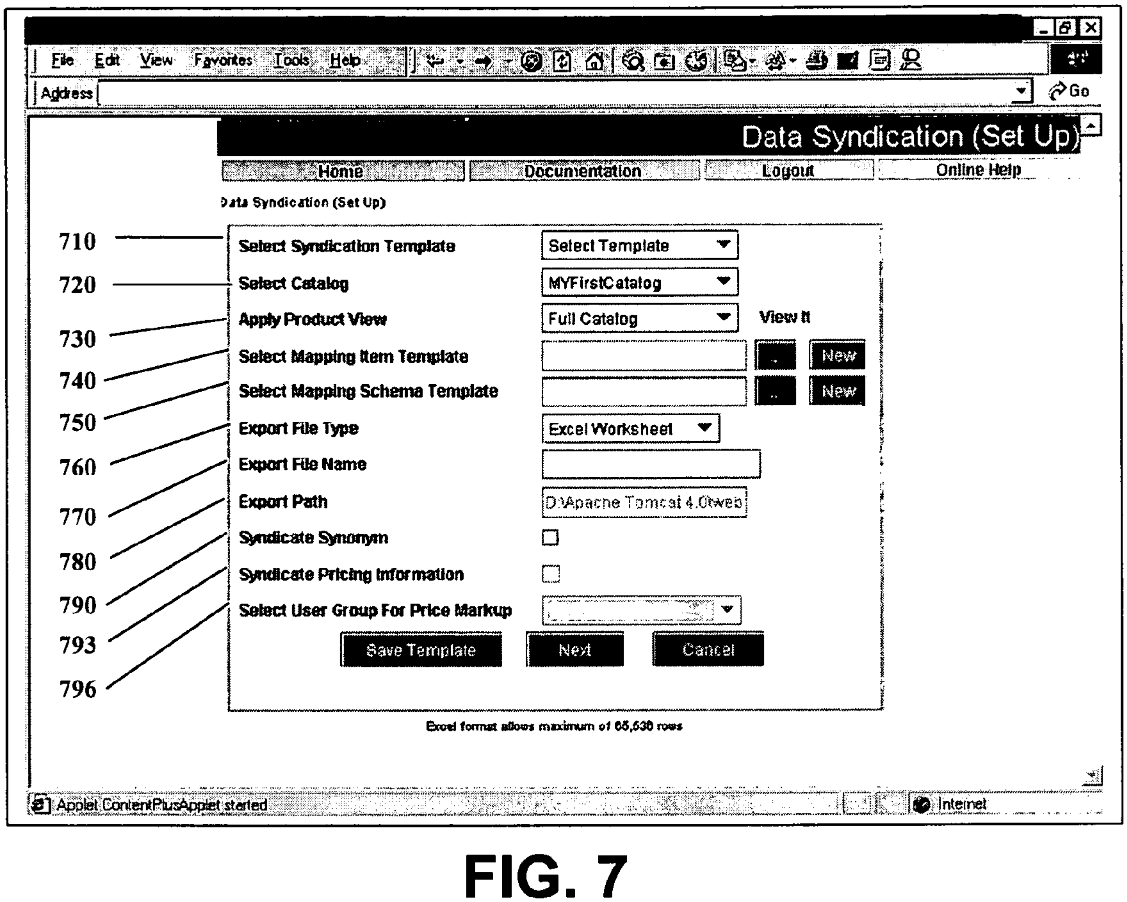
FIG. 7 illustrates a screen for setting up a syndication process.

FIG. 7 illustrates a screen for a User to setup a syndication process for exporting rich-content repository data for external use. The steps include:

selecting a syndication template 710;

selecting a catalog 720;

electing a product view 730;

selecting a mapping item template 740;

selecting a mapping schema template 750;

specifying the export file type 760;

specifying the file name 770;

specifying the file path 780;

specifying if there is a syndicate synonym 790;

specifying if there is syndicate pricing information 793; and selecting a User group for price markup 796.

Figure 8:
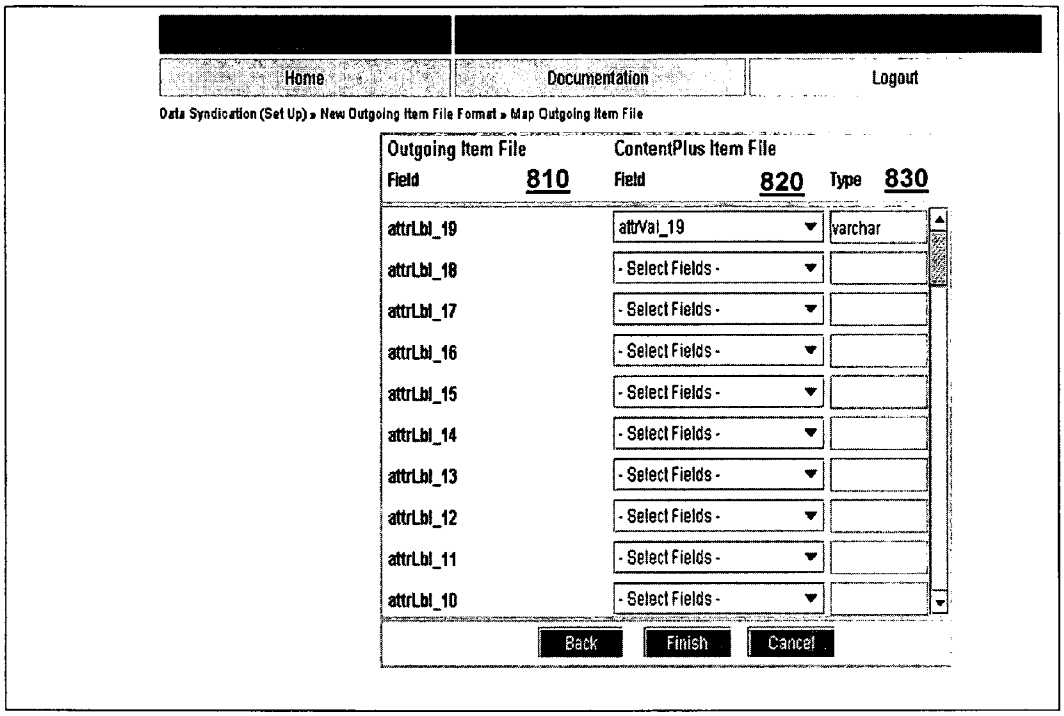
FIG. 8 illustrates a screen for mapping User-defined fields to rich-content items to be syndicated.

FIG. 8 illustrates a screen for handling User-defined fields during data syndication setup. The Data Syndication functionality enables the User to map both User-defined fields and standard fields in the same mapping process. That is, a template enables the User to map both standard fields 820, and User-defined fields 820, to outgoing item fields 810. The screen illustrates an outgoing Item file's field column 810, the field columns (comprising User-defined fields and standard fields) 820 and a data type column 830. Fields that are left blank are populated with their default values if assigned. Unless and until the required approval process accepts all values entered, the system does allow the User to save the item information.

The syndication process, associated with a rich-content repository created and maintained by the present invention, provides a User with a capability to transform existing item information according to at least one schema required by a receiving rich-content repository—such as UCCnet. The User is able to syndicate the items with User-defined field values using any of pre-defined file format, e.g., MS Access, Excel, CSV and XML.

User-Defined Hierarchical Relationships

In a preferred embodiment of the system and method of the present invention, the smart fields also provide a User with a capability for defining hierarchical relationships between data records. This added dimension of intelligence provides the User with an enhanced understanding of the rich-content items they are viewing, researching, selecting or publishing (syndicating).

Figure 9A:
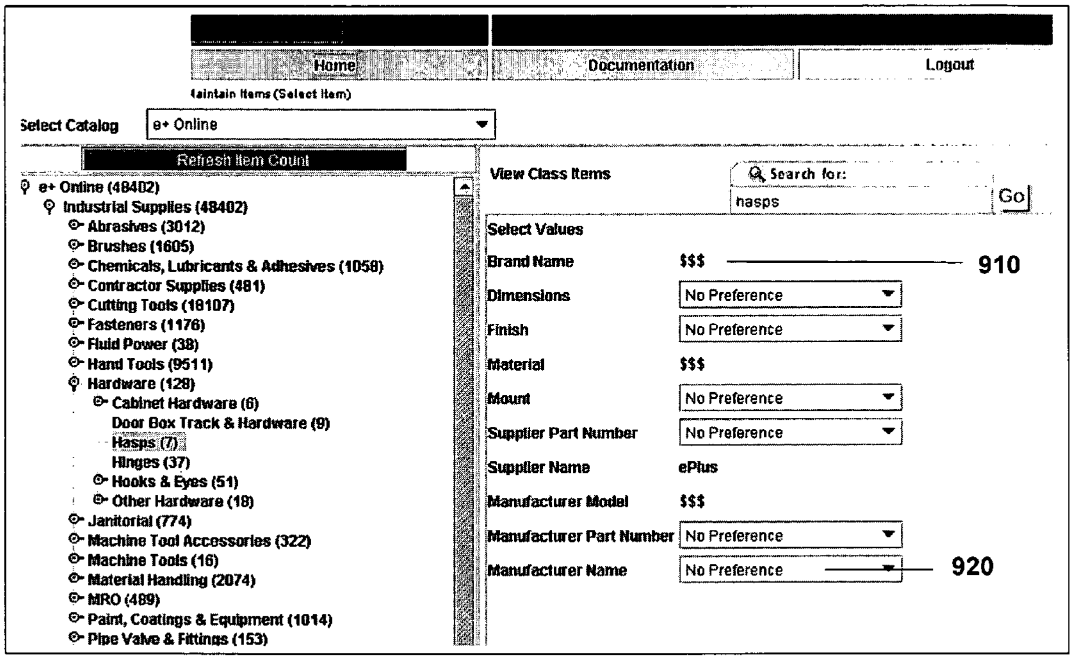
FIG. 9A illustrates a screen for establishing User-defined hierarchical relationships.

FIG. 9A illustrates how a User, while entering or editing item data in a rich-content repository, can choose to associate an item brand name 910 with the item's manufacturer 920. To implement this smart field functionality, the User indicates, in a selected field, to which higher level data record the current data record is to be linked. The linkage relationship can be based on any association concept the User selects. A typical association is the identification of different brands offered by a single manufacturer. An example is linking products such as "Post-it" with the records of their manufacturer—3M. These linkages provide a User, when viewing or syndicating an item, with the capability of dealing only with brand-related items that are associated with the manufacturer.

The system and method of the present invention also provides a User with a capability for obtaining views (FIG. 9B) and reports that show the associations, either in the aggregate (where the branded items are grouped by manufacturer and summarized to get one total for all brands under a manufacturer) or in a grouped manner (where branded items are grouped by manufacturer yet listed separately to show their individual characteristics).

Figure 9B:
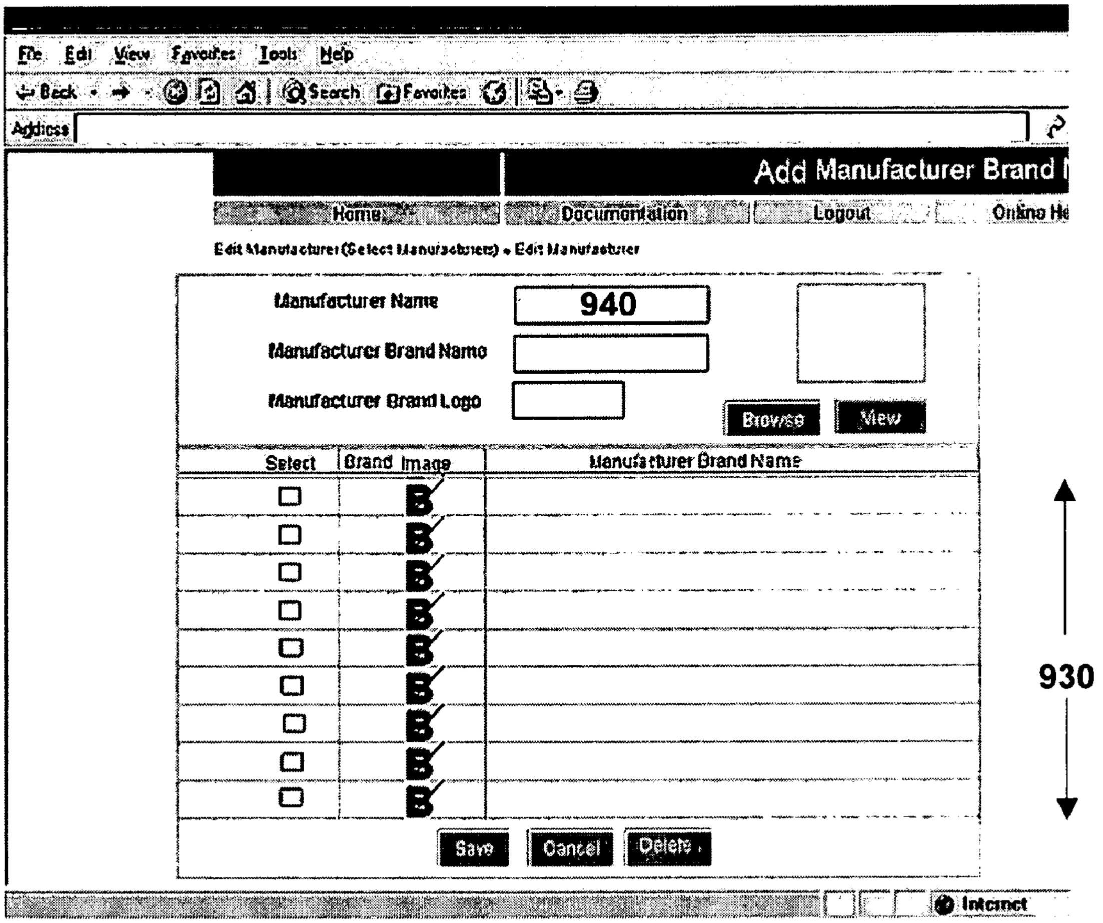
FIG. 9B illustrates a screen for viewing User-defined hierarchical relationships.

FIG. 9B illustrates a screen that allows a User who has selected a manufacturer in a prior screen to view different brands 930 that are associated with the selected manufacturer 940. A record can belong to more than one association and each such association is recorded in a different field. More than one level of hierarchical relationship can be established. For example, brands associated with a manufacturer are an example of one level of association, and the manufacturers associated with their holding company are another example.

User-Defined Global Changes

In a preferred embodiment, the system and method of the present invention provides capabilities for the User to make global field value updates to selected product item fields for a selected range of records. For example, using the hierarchical relationship functionality, the User can selectively make global updates to the pricing fields of some or all brands associated with a manufacturer.

Figure 10A:
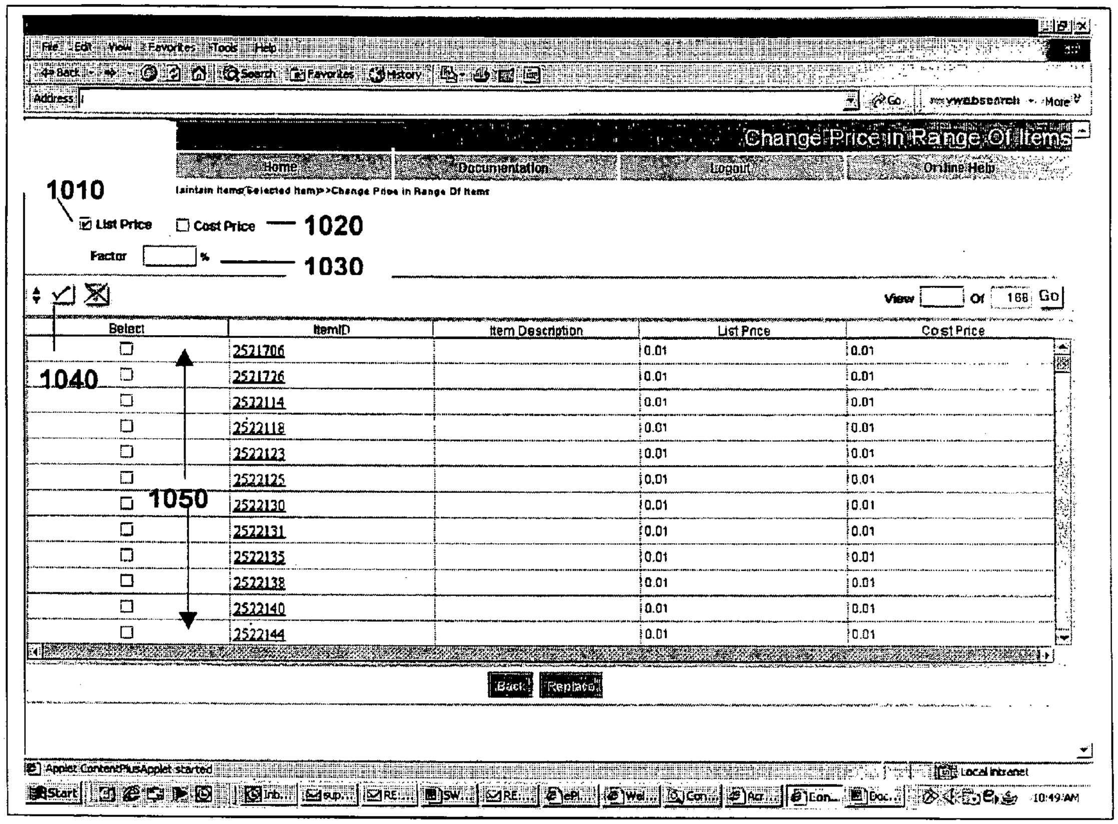
FIG. 10A illustrates a screen for making global price changes to a range of selected items.

FIG. 10A illustrates the process of making global changes to prices for a range of items that have been selected for global update. To update prices, the User selects the type of update—list price 1010 or cost price 1020, enters the price adjustment factor—say 5% 1030, and selects all 1040 or some 1050 of the selected range of items. The system makes the adjustments, and shows them to the User for final approval before committing them to the rich-content repository.

Figure 10B:
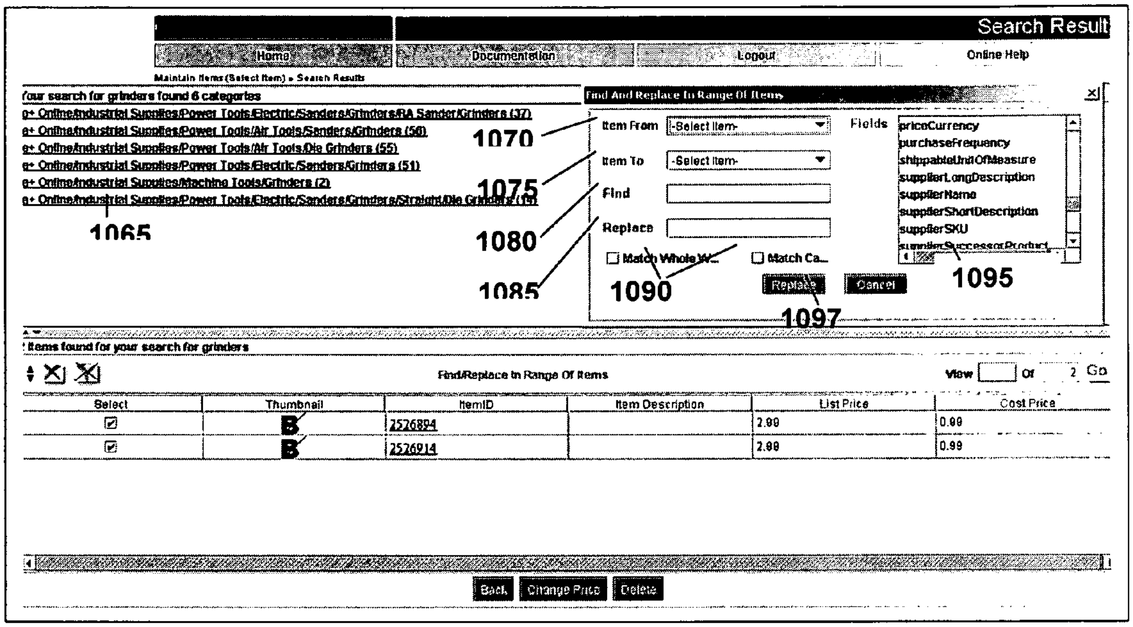
FIG. 10B illustrates a screen for making global changes to a range of selected items.

FIG. 10B illustrates the process of making global changes to other types of fields. From the results of a search 1065, the User selects the from range 1070 and the To range 1075 for the items to be updated, selects the field to be updated 1080, enters the text to be found 1085 and the text to be used to replace it 1090, selects the type of search (ie match whole words, match case, etc) 1095 to be conducted on the selected items to find the text to be updated, and directs the system to do the global replacements 1097.

During the update process, the User can review the global replacements and edit them as needed. In addition, the User can add to, delete or replace item related attributes, synonyms, accessories, images or attachments in the rich-content repository. Once a User is satisfied with the updates, Approvers (a type of User) are prompted to accept the global update request. Once the request is approved, the updates are made. The User is prompted with one final chance to rollback the update. If the User chooses to commit the update, the changes cannot be rolled back. The system and method of the present invention produces an audit report, identifying who made which changes on what date.

Real Time User-Adapted Pricing

Figure 11:
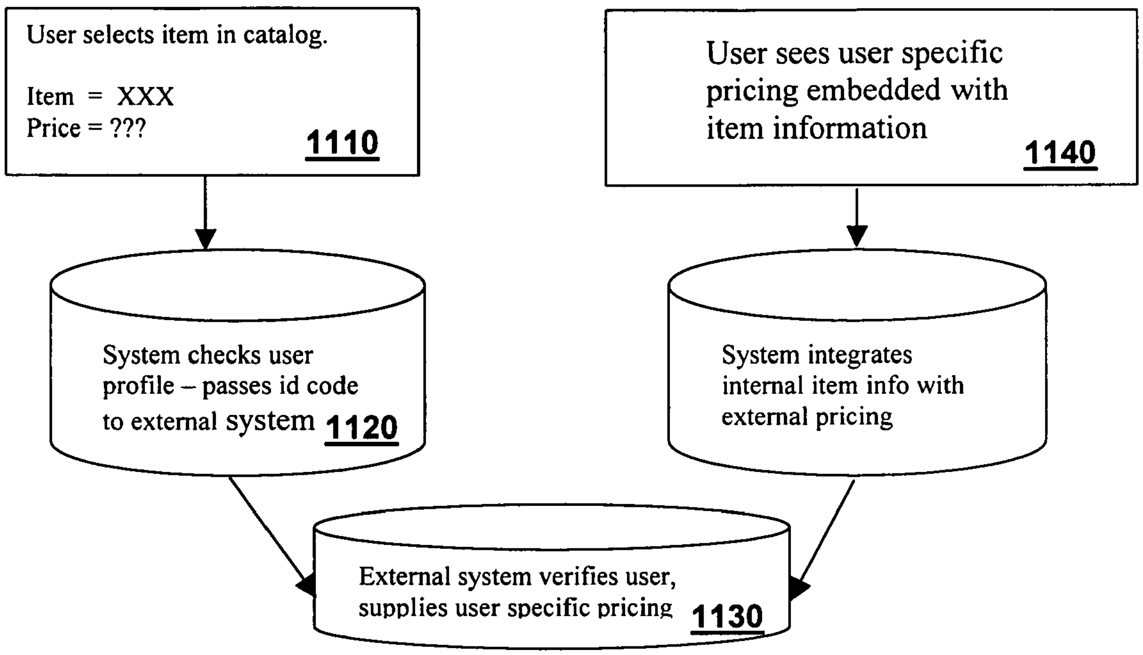
FIG. 11 illustrates the use of real time User adapted pricing

In a preferred embodiment, the system and method of the present invention provides capabilities for a User to view real-time, User-adapted pricing for selected items. For example, if User-based pricing rules for selected catalog items are contained in another system (i.e., an external ERP system), when a User selects a catalog item as in FIG. 11 at 1110, the system connects to the external system and passes the User profile iID to that system 1120, the external system verifies the User and returns the User-based pricing 1130, the system integrates the User based pricing with the other item information from the rich-content repository and presents it to the User 1140.

Collaborated Hot List

In a preferred embodiment, the system and method of the present invention provide capabilities for a User to dynamically work with other Users for the creation of a "collaborated hot list". For example, selected Users from different departments who are responsible for providing new employees with their initial supplies, can asynchronously access a collaborated hot list, and add, modify or delete items as needed to keep the "new hire" hot list current and accurate. Based on the access rights in their profiles, the system and method of the present invention provide capabilities for Users to create, view, add, delete or modify items stored in a "hot list" template. Users from different functions can collaborate on the joint creation and maintenance of "hot list" templates that relate to their shared tasks.

Figure 12:
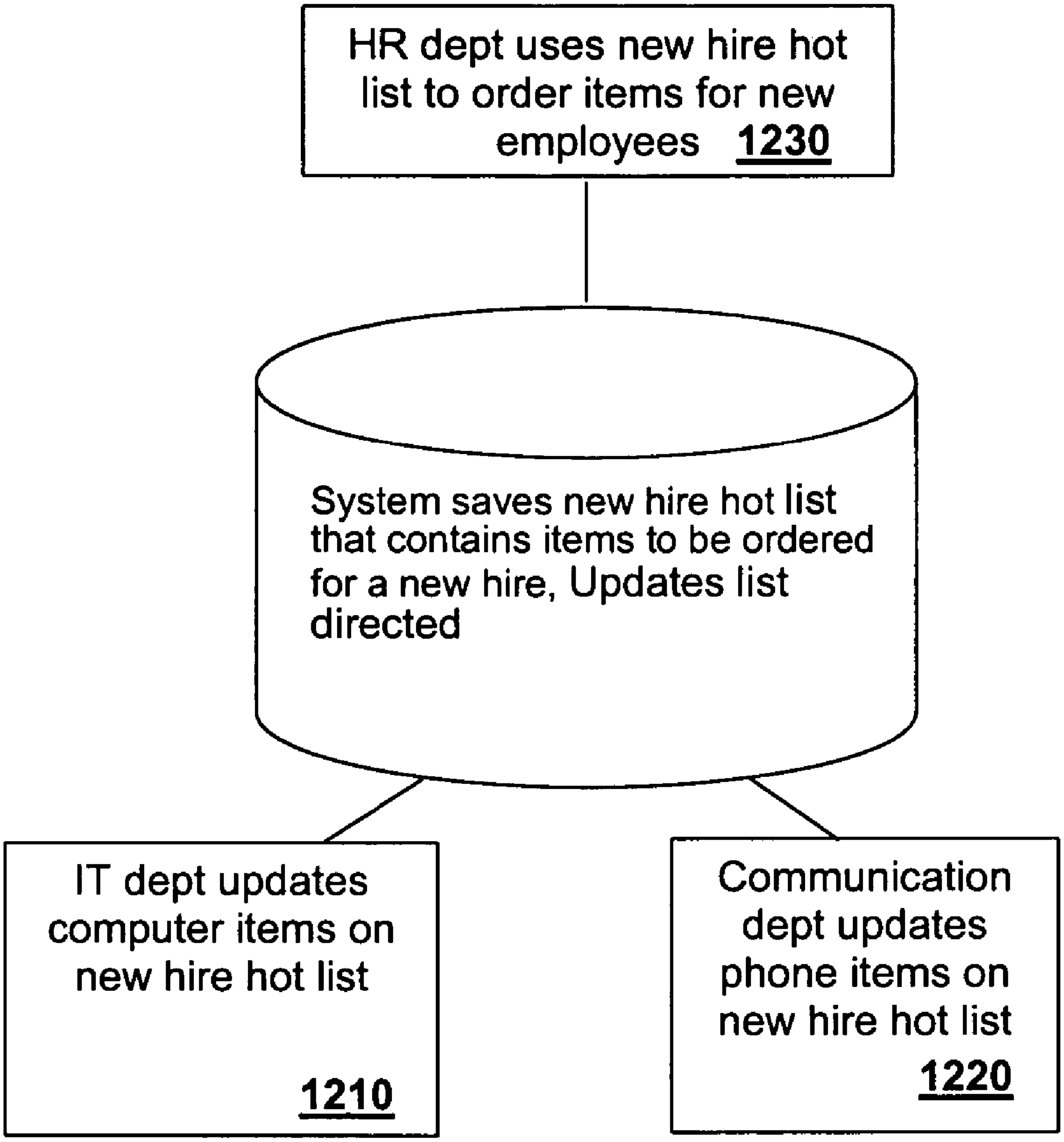
FIG. 12 illustrates the use of a collaborated hot list

FIG. 12 illustrates how a "new hire" collaborated hotlist is collaboratively updated at different times from different locations by: Users from the IT department who maintain the organizations computer item requirements 1210, and Users from the communications department who maintain the organizations phone item requirements 1220. When the people in the human resources department are registering a new employee, they call up the new-hire collaborated hot list 1230, and place an order for the approve equipment that is being collaboratively maintained by the appropriate departments.

User-Defined Marketplace Selection

In a preferred embodiment, the system and method of the present invention provides capabilities for User definition and access to a "User-defined marketplace" within the context of the purchasing process. For example, the User can define a marketplace by selecting at least one external catalog to add to the internal catalogs, to create a "User-defined marketplace". The User accesses the external catalogs by "punching out" to one or more of User-selected catalog sites and selecting items from those sites. These selected items are placed in the User's internal shopping cart, along with items from internal and/or other external catalogs. The shopping cart is then routed through a User-specified approval process. Once approved, the items in the shopping cart are ready to be included in a purchase order.

The system and method of the present invention provides the User with the capability to define the configuration parameters and to map internal rich-content repository fields to fields of the external site(s). For reporting purposes, the shopping cart information returned from the Punchout site is separately stored in a local rich-content repository. Users can view this information in a separate report.

Figure 13:
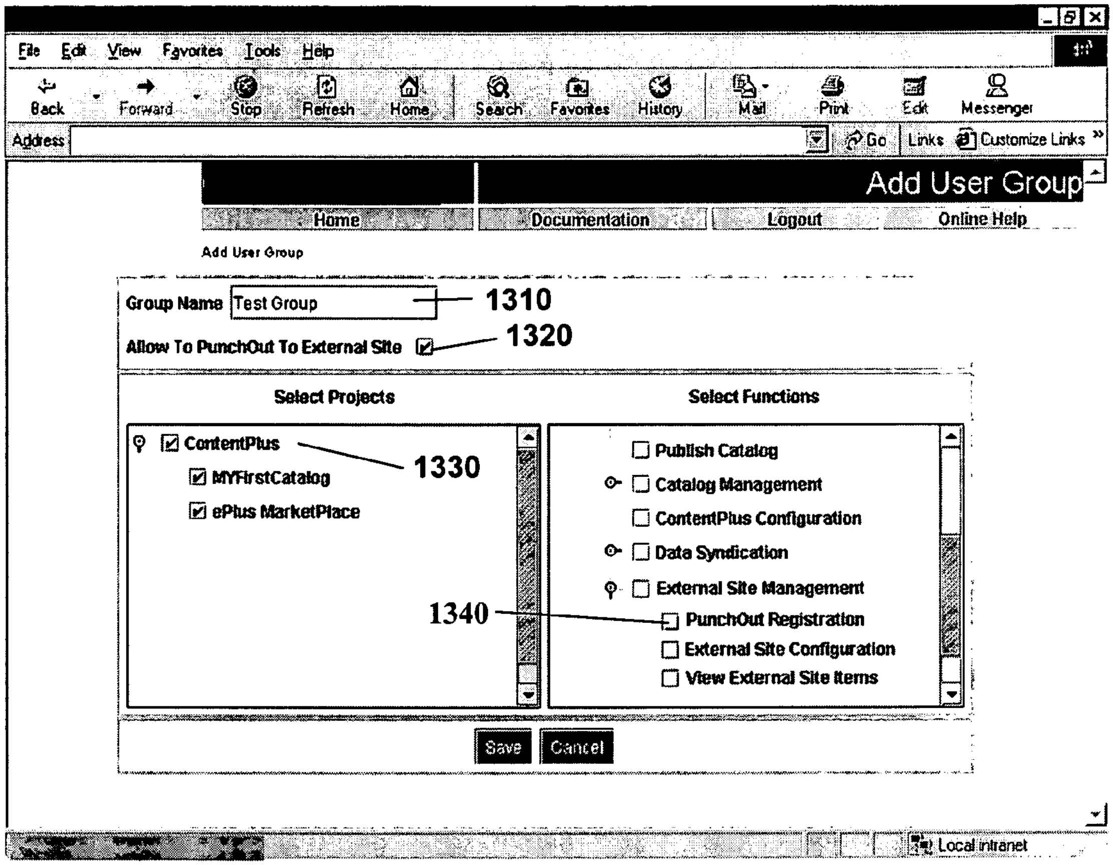
FIG. 13 illustrates a screen for giving User groups the rights to punch out to other sites.

FIG. 13 illustrates a screen that enables Users who elected to add a new User group to name the User groups 1310, to assign rights to members of the group to punch out to other sites 1320, to select the projects for which these rights apply 1330, and to identify the functions to which the new group members have rights—e.g., to select punchout registration 1340.

Figure 14:
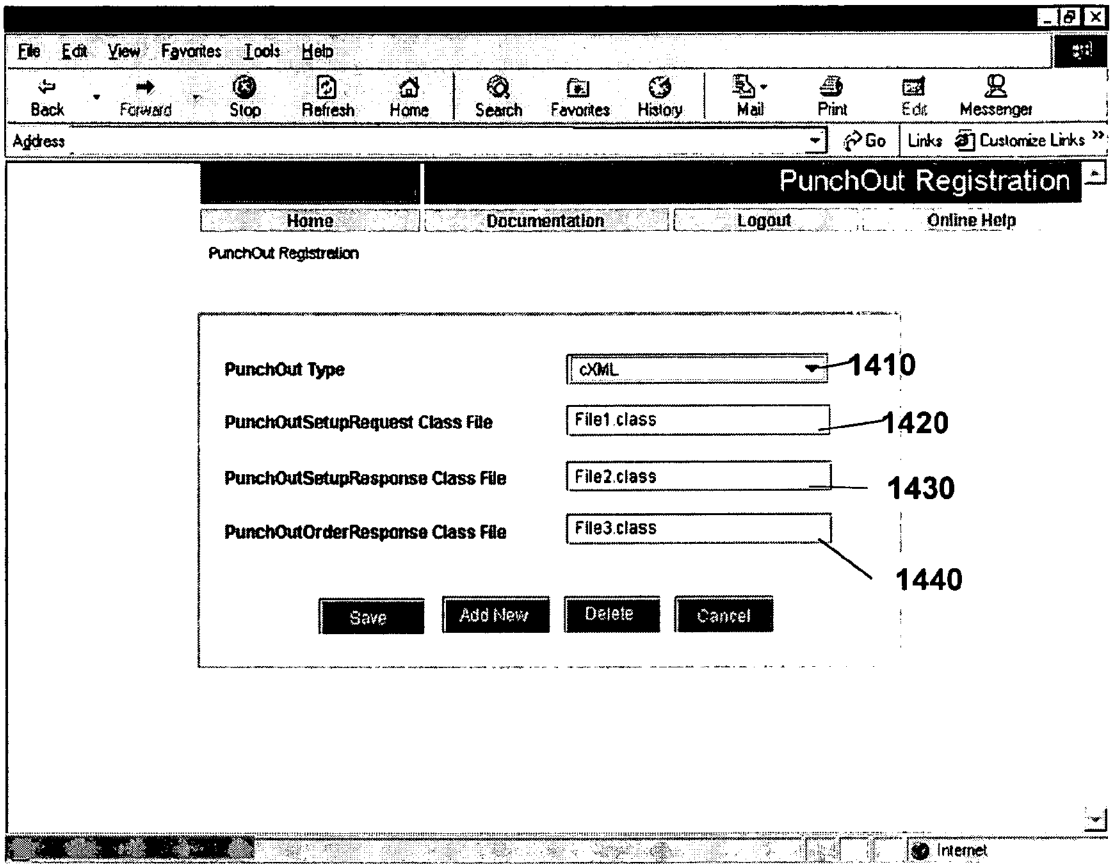
FIG. 14 illustrates a screen for registering a punchout site.

FIG. 14 illustrates a screen for registering a punchout site. A User identifies the punchout type 1410—for example cXML, the punchout setup request class name 1420 that contains the format for the file that will access the punchout site, the punchout setup response class name 1430 that specifies the format for capturing the data obtained from the punchout, and the punchout order response class name 1440 that specifies the format for the items to be presented in the shopping cart.

Figure 15:
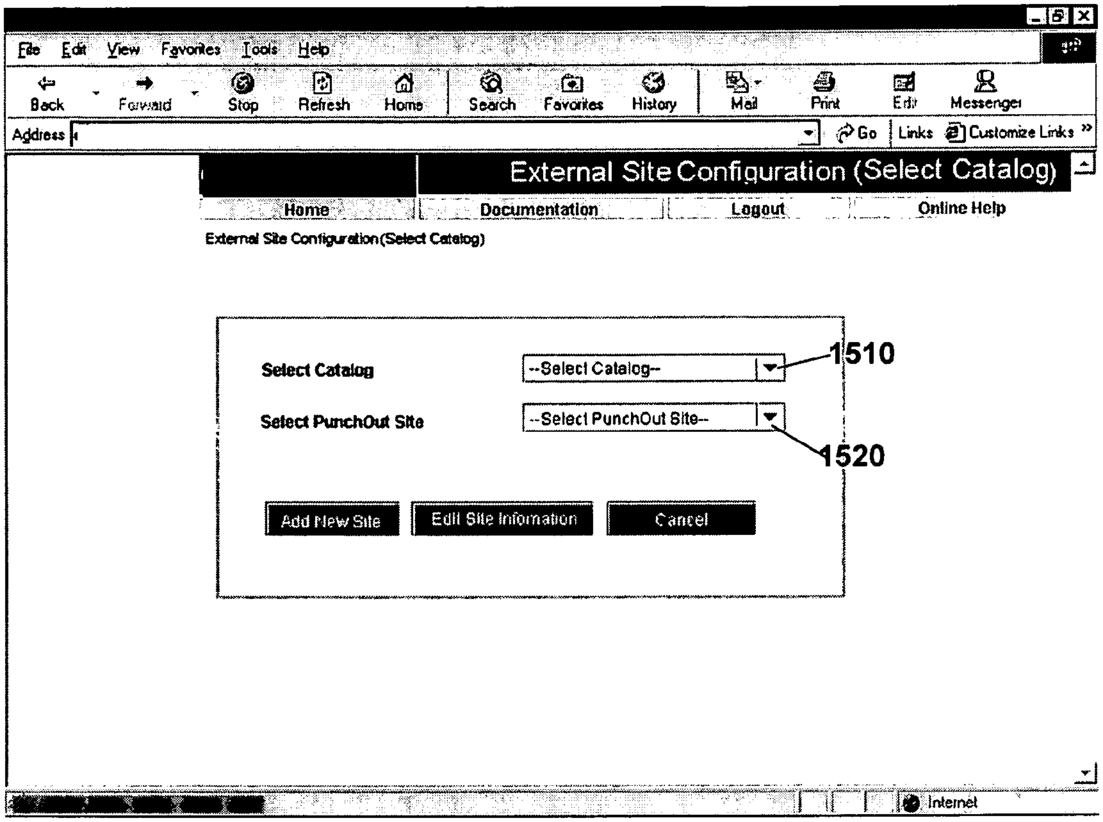
FIG. 15 illustrates a screen for selecting an external catalog and a punchout site.

FIG. 15 illustrates how an external catalog 1510 and punchout site 1520 are selected.

Figure 16:
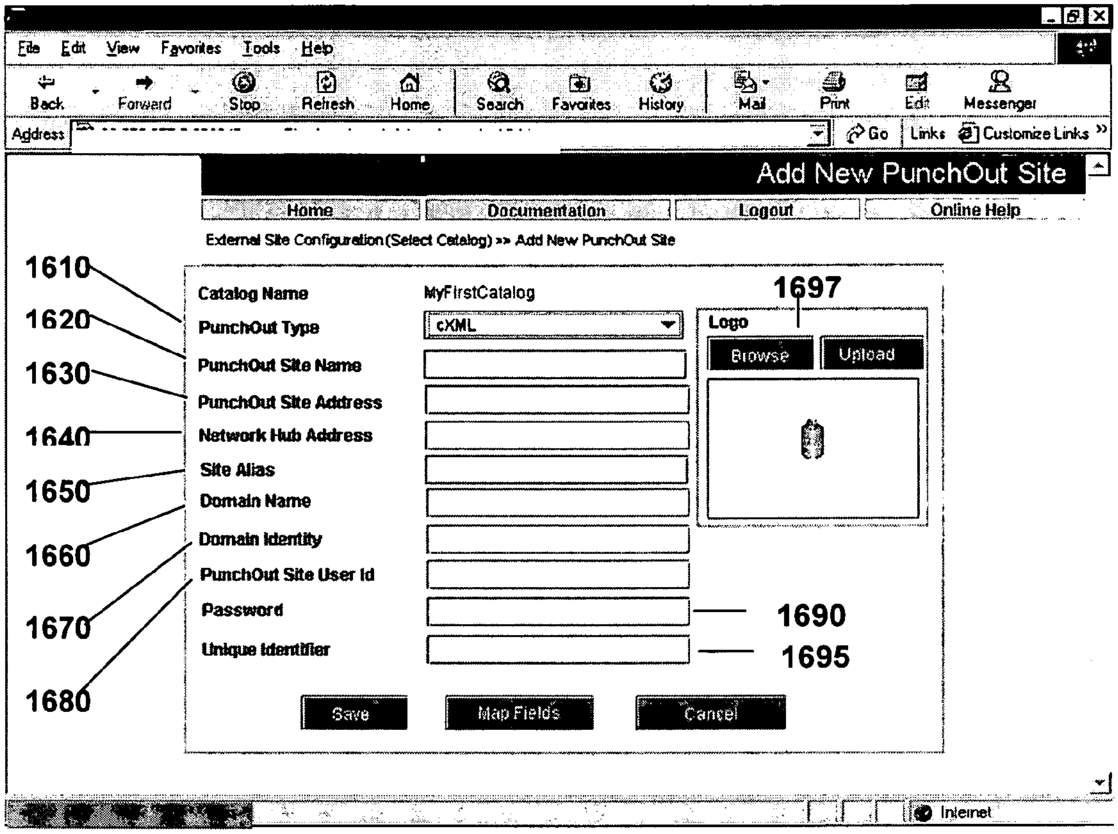
FIG. 16 illustrates a screen for configuring an external site as a punchout site.

FIG. 16 illustrates a screen for configuring an external site as a punchout site for a selected catalog. The User enters the required attribute information including the punchout type 1610, the punchout site name 1620, the punchout site address 1630, the network hub address 1640, the site alias 1650, the site domain name 1660, the site domain identity 1670, the punchout site User id 1680, the Users password for the punchout site 1690 and the User's unique identifier if there is one 1695, and identified or uploads a site logo file 1697. This information can be edited by a User at any time.

Figure 17:
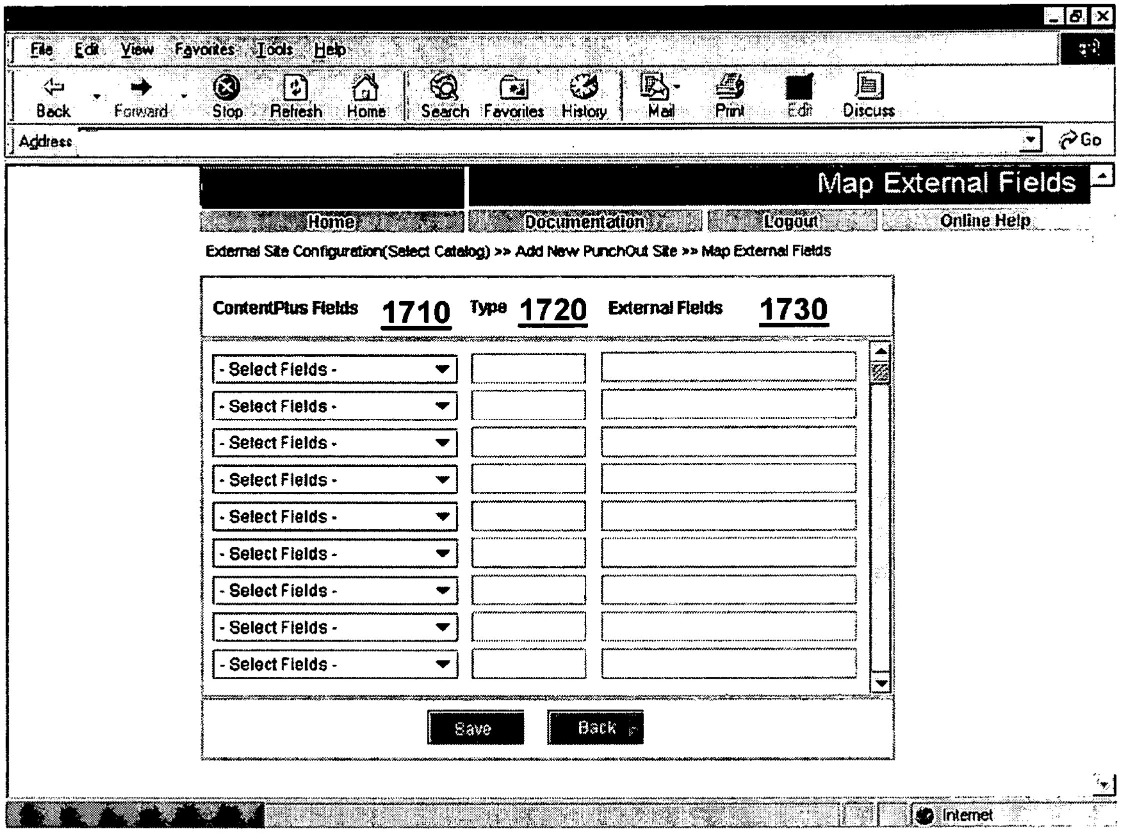
FIG. 17 illustrates a screen for mapping internal fields to external/punchout fields.

FIG. 17 illustrates a screen for mapping external/punchout fields with internal rich-content repository fields and for identifying data types. The User selects an internal field 1710, identifies the field type 1720, and specifies the external data field 1730 to which the internal field is to be linked.

The User can select a pre-saved linking template, and edit this template to fit a current situation. The system and method of the present invention also can manage punchouts based on User/Shopper Groups, where a subset of users within a catalog system can view/shop punch-out sites.

Figure 18:
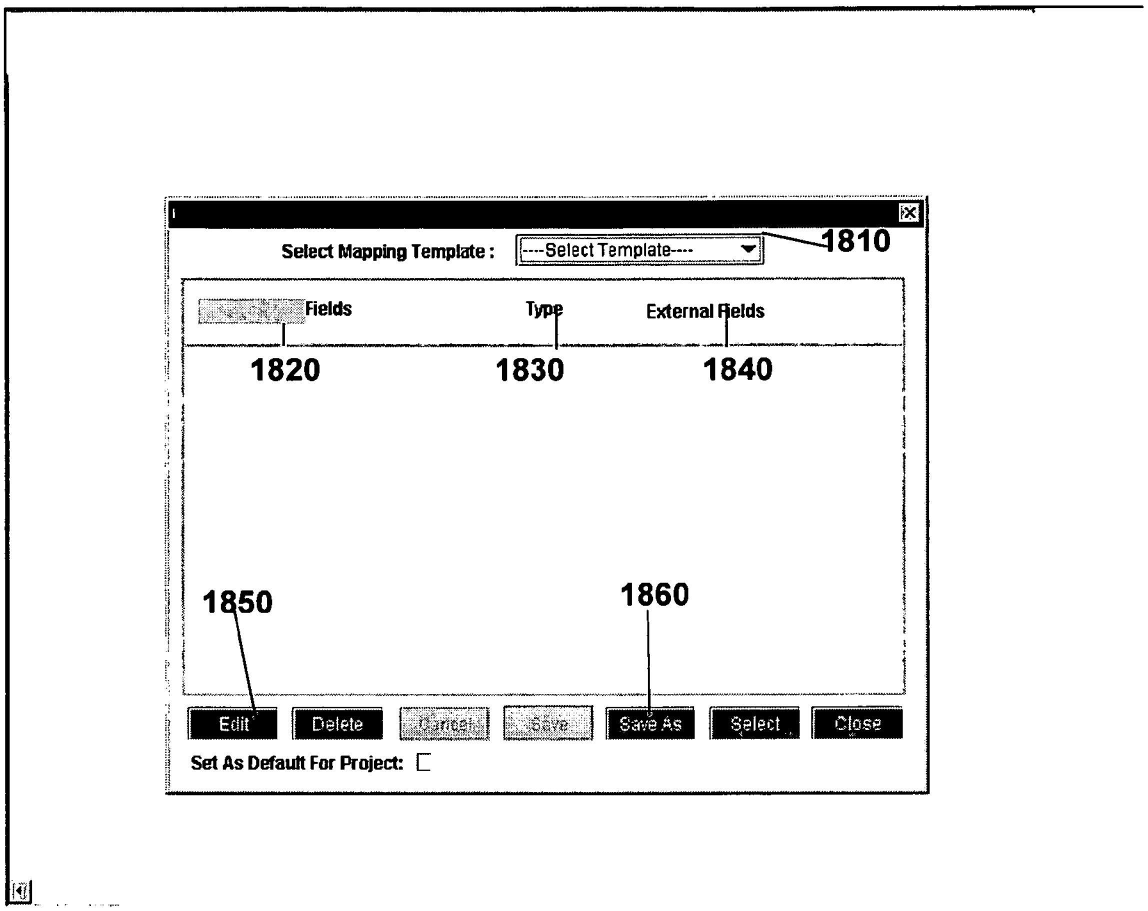
FIG. 18 illustrates a screen for selecting a mapping template.

FIG. 18 illustrates a screen for the selection of a previously defined and saved template for mapping internal and external data fields. The User selects the saved template at 1810. The fields of the saved temlate (internal fields 1820, data types 1830, and external fields 1840) can be edited 1850 and the templates re-saved 1860 using the same name or a new name.

Figure 19:
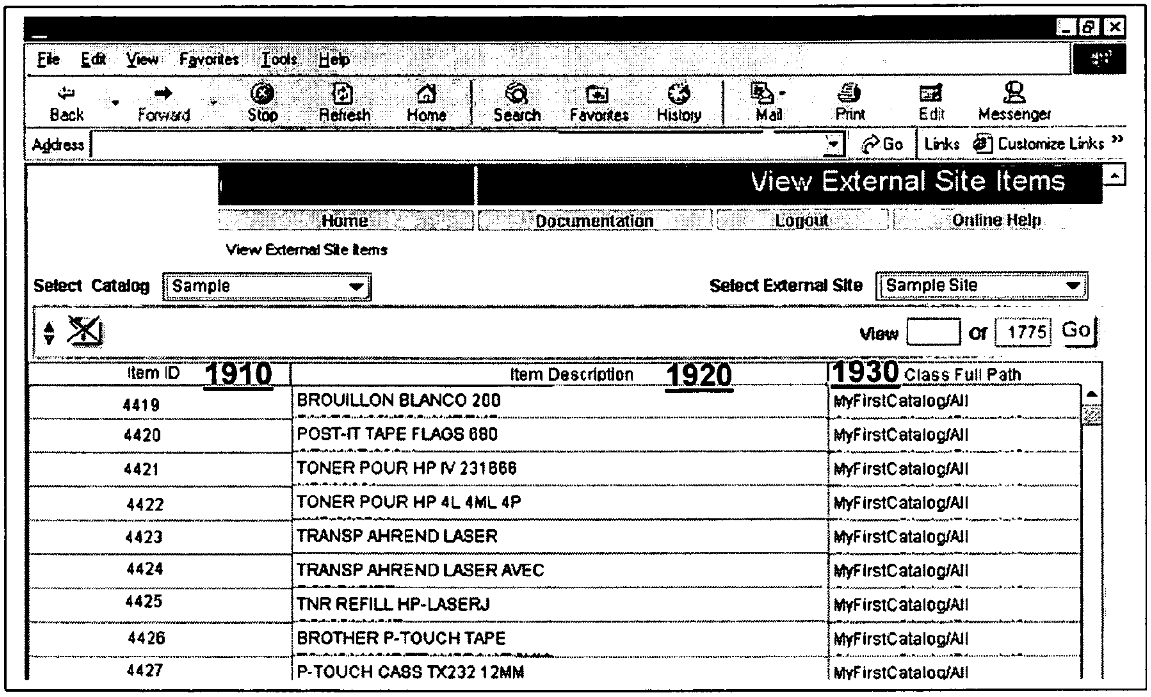
FIG. 19 illustrates a screen for displaying external site items.

FIG. 19 illustrates a screen for displaying external site items. This screen displays the item id 1910, the item description 1920, and the ClassFull Path 1930.

The Class Full Path represents a hyperlink to the hierarchical structure of the catalog using Commodity Class Names. It provides a User with a capability to navigate a catalog to find similar products; or to place them into any portion of the catalog. It provides a capability for a User to view the context in which a catalog item is classified. For example, if a User wants to know more about an item, such as a fastener, the Class Full Path link lets the User see a context which tells the User it is a Spare Part Bolt for a Specific OEM (which is part of Commodity Class Name), or a Common Commodity Bolt as a child of the class Building Supplies.

Figure 20:
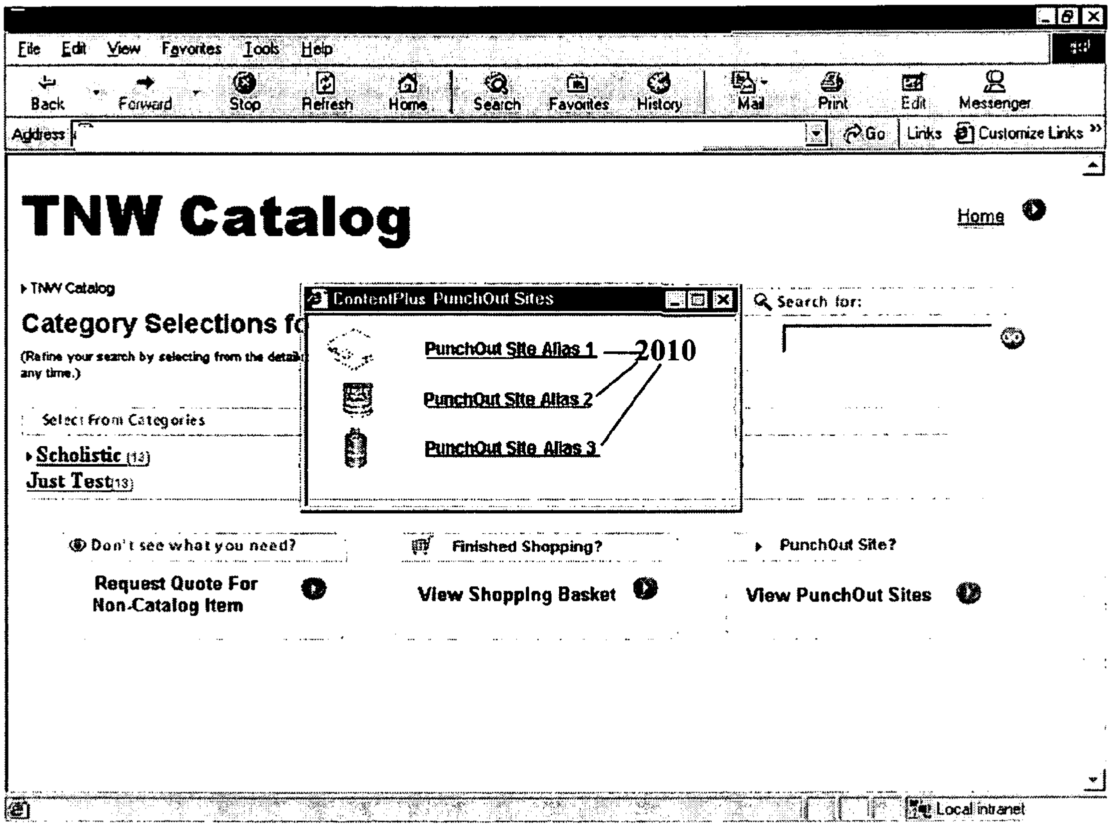

FIG. 20 illustrates the "navigation" screen that provides the User with a capability for selecting one or more punchout sites 2010.

User-Driven Contract Compliance Monitoring

In a preferred embodiment, the system and method of the present invention provide a User capabilities for monitoring vendor contract compliance. The User provides vendor contract rules related to contract elements that are to be tracked and monitored. These include rules related to item pricing, volume purchasing, discount time ranges, special discounts, item quality, shipment costs and timelines, item availability, item substitution, supplier substitution, price increases, maintenance fees, item returns, prompt payment discounts, and other criteria that Users enter in the User-defined fields.

Figure 21:
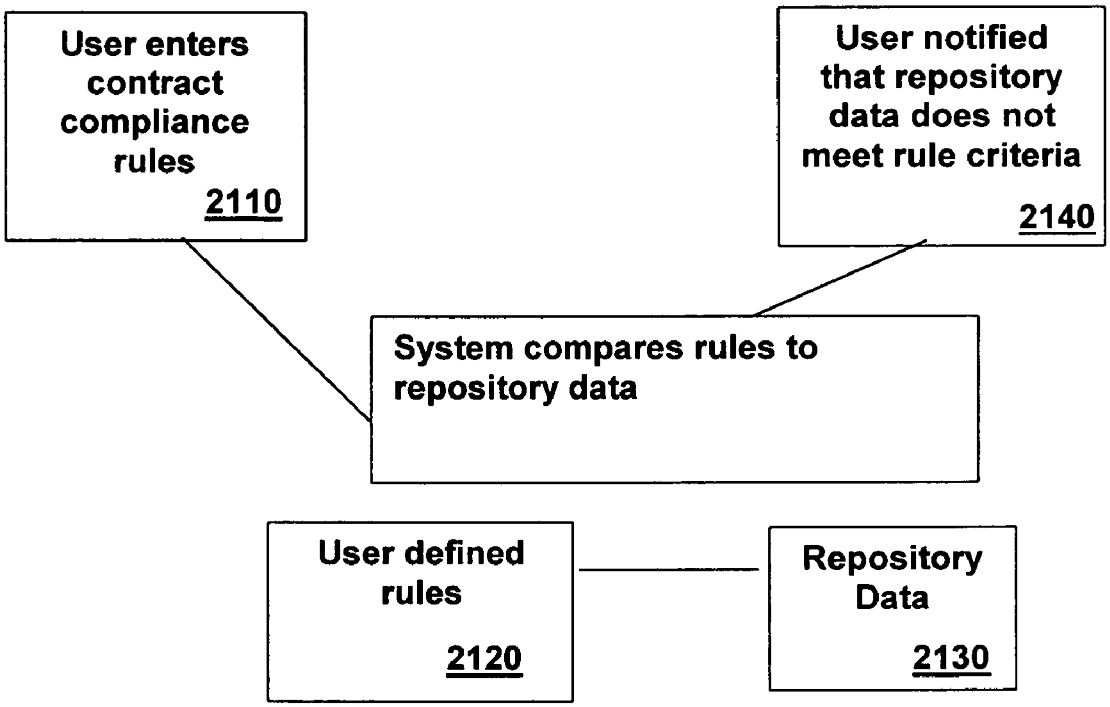
FIG. 21 illustrates the process of contract compliance monitoring.

FIG. 21 illustrates the process where a User enters the rules for contract compliance 2110, the system compares the rules 2120 to existing rich-content repository data 2130, and notifies the User when a discrepancy occurs 2140, e.g., when a data element lies outside a range of data required by a rule. For example, the pricing of items selected for a shopping cart is compared to the User-defined contract rules, and the User is notified if the item pricing does not comply with the contracted rules, e.g., if an item's current purchase price is greater than the contracted price.

User-Assigned Global Level Pattern Matching Rules

In a preferred embodiment, the present invention provide capabilities for a User to refine item classification and item retrieval by subdividing system-generated class patterns by attribute name. This capability allows Users to create a Library of Patterns. The User can apply Global Level pattern matching rules (a library of Patterns) that are common to all types of rich-content that share the same characteristic. Where size is described as a fractional number or a decimal Users may "Call" all existing fractional size patterns stored in the system to read the incoming data as non-standardized input. When a correlated size is found within the descriptive text information, incoming data is interpreted and a standardized output created based on the global level pattern.

Figure 22:
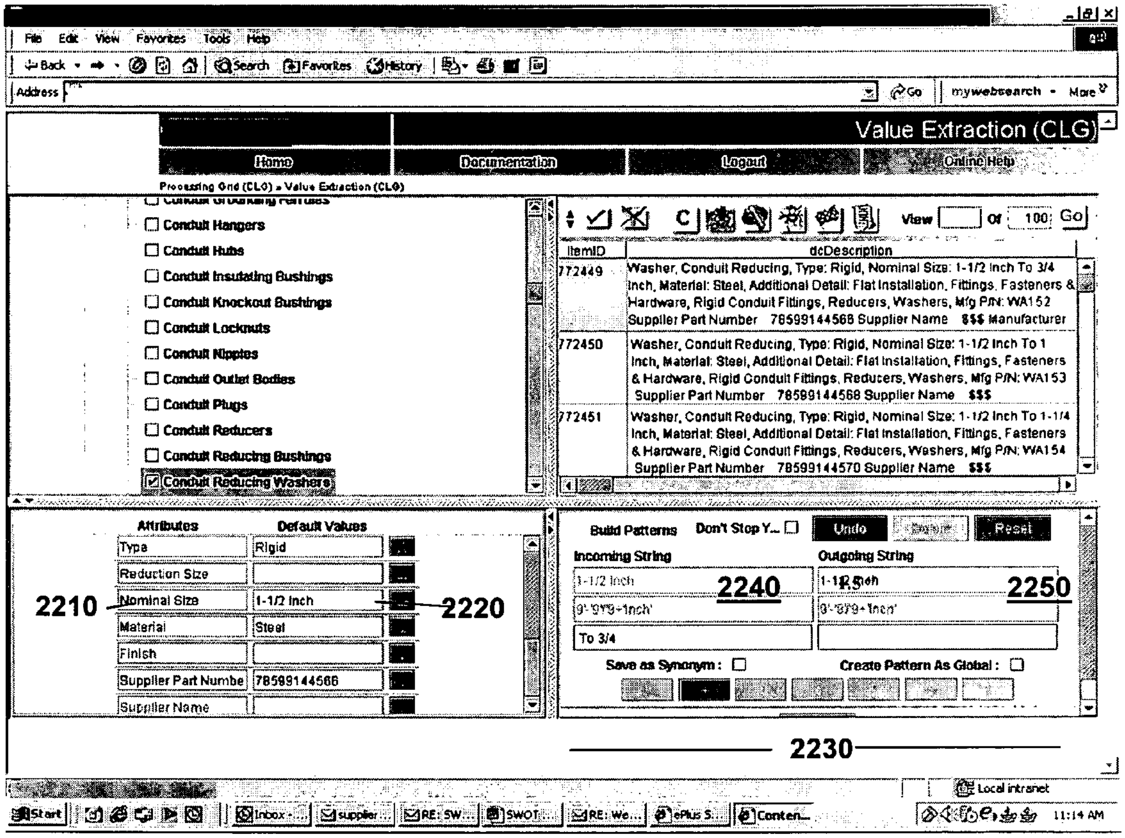
FIG. 22 illustrates the process of subdividing class patterns by attribute name.

FIG. 22 illustrates a screen for the User to select an attribute such as nominal size 2210, and enter a default value 2220, say 1½ inch, to be used if an incoming data field is empty. The User can then build a global pattern 2230 by defining an incoming string 2240, say 1½ inch, that is to be transformed into an outgoing string 2250 say 1.5". The pattern can be saved as a library pattern and reused as needed.

In a library pattern, the system provides capabilities for a User to deploy a "token" rule. The token rule is a generic statement of a specific rule. A token rule implements the transformation defined in a pattern, and accomodates all permutations of the pattern found in the input file. Using a token frees the User from entering all possible combinations of possibilities for input and output rules. For example, a base rule can be set up to transform input (1/2") into output (1/2 in). The corresponding token rule would be entered as input (9/9") and output (9/9 in). The "9" is the token that acts like a "wild-card" and transforms any numeric input data. Thus, if an input field contains 6/16", while it does not contain 1/2", it does fall under the 9/9" token rule; so the system and method of the present invention returns an output of (6/16 in).

This feature facilitates the handling of two problems Users face in rich-content standardization. First, repetitive processes of finding data elements and converting to a standard are captured as knowledg-based pattern matching rules that can be reused. Second, this capability provides standardization across multiple commodities and facilitates comparison for cross matching items from multiple sources.

User Driven Dynamic Hot List Updates

In a preferred embodiment, the system and method of the present invention provides a capability for a User to create a "dynamic hot list" by saving items in a shopping cart that represent repeated purchases. When the User accesses the saved "dynamic hot list", the present invention checks the items for changes since the list was last saved. The changes are noted and presented to the User.

Figure 23:
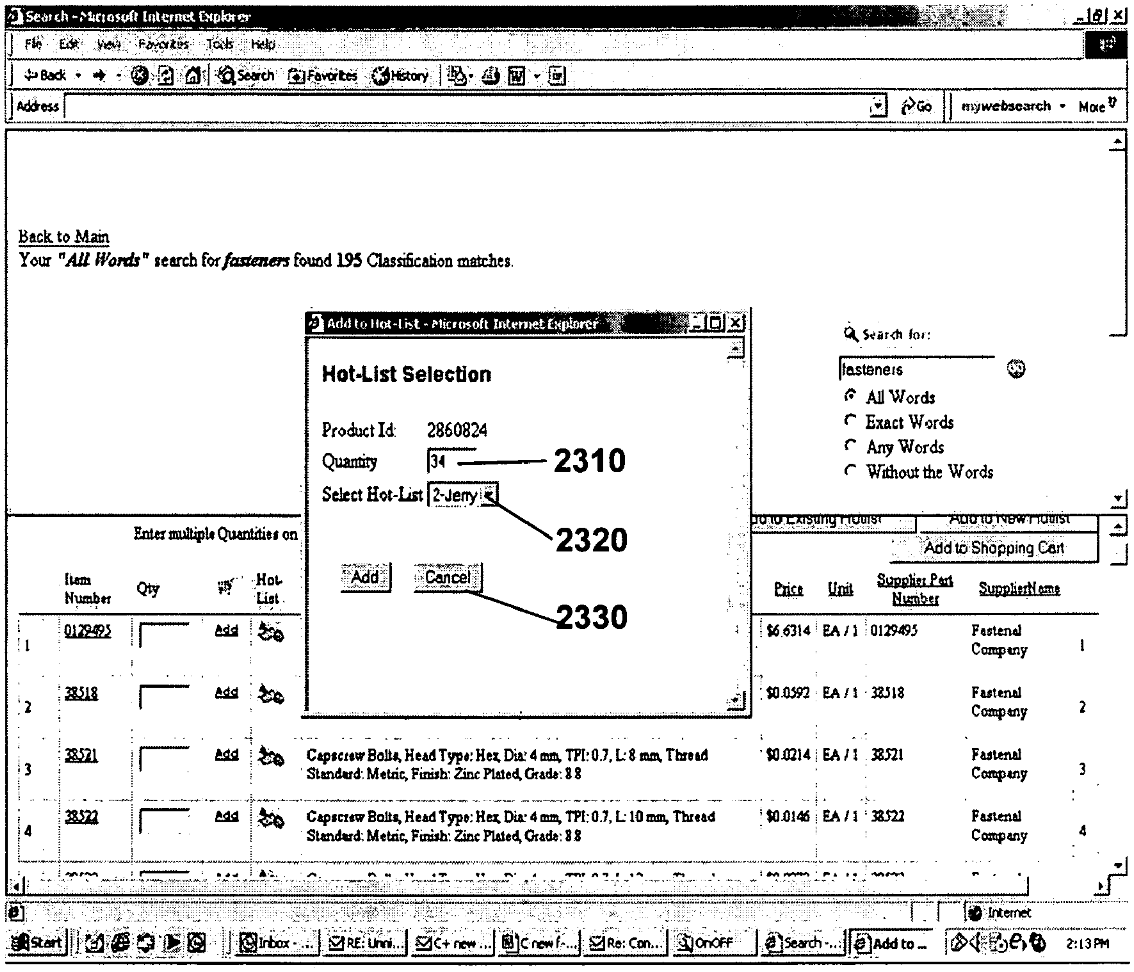
FIG. 23 illustrates a screen for adding an item to a hot list.

FIG. 23 illustrates a screen that enables a User, who has selected an item, to add that item to a saved "dynamic hot list". The User sees the product ID of the selected item 2310, enters the quantity of the item to add to the "dynamic hot list" 2320, and selects a "dynamic hot list" name from the drop down list of saved "dynamic hot lists" 2330 to which to add the selected product.

User-Defined Exception Reporting

In a preferred embodiment, the system and method of the present invention provides capabilities for a User to specify operational events to monitor. For these events, the User specifies the criteria the system uses to monitor the event, and the action the system is to take when an event does not meet the criteria. This allows the User to dynamically manage operational variations on an exception basis. For example, to facilitate the management of imported data files, the User can request notification when missing data in mandatory fields is identified. Or, to identify potential mapping issues, the User can request notification whenever changes occure to external schemas that have been mapped to internal schemas.

Figure 24:
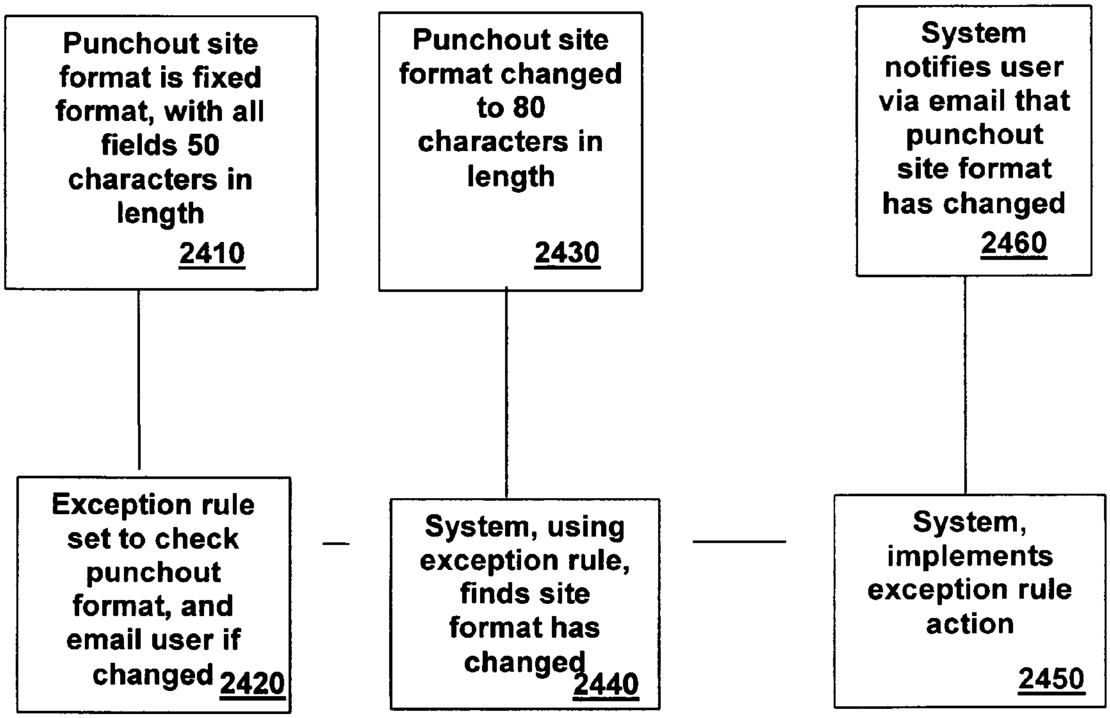
FIG. 24 illustrates the process of setting up User-defined exception reporting.

FIG. 24 illustrates the process for User-defined exception reporting in cases where there are changes to data formats at a punchout site. The User checks the punchout site data format 2410, and sets up an exception rule in the system 2420 to reflect that format. The punchout site changes its format 2430. When a User next punches out to the site, the system uses the exception reporting rule and finds that the punchout site format has changed 2440. The system implements the action component of the rule 2450 and sends an email notification to the User who established the rule 2450. The User can then notify catalog development staff to modify the files that contain the punchout site formats.

User Selected Composite Data Fields

In order to meet User or external system requirements, in a preferred embodiment, the system and method of the present invention provides a capability for a User to develop composite data fields that are concatenated from customized parts of existing rich-content fields. For example, the User (1) selects the character length of the composite rich-content field, (2) selects the one or more fields that will be combined to make up the composite field, (3) determines the sequence in which these fields are combined, selects whether a field's abbreviation or its full data element is to be used in the composite field, and (4) selects the delimiter to be used to separate the component parts. The rich-content data is then obtained from the selected fields and is put into an order the User specifies. The specified delimiters are added, and the resulting rich-content datum is placed in the composite field. Capabilities are provided for the User to manually edit the composite field before it is saved in a rich-content repository and/or exported.

Figure 25A:
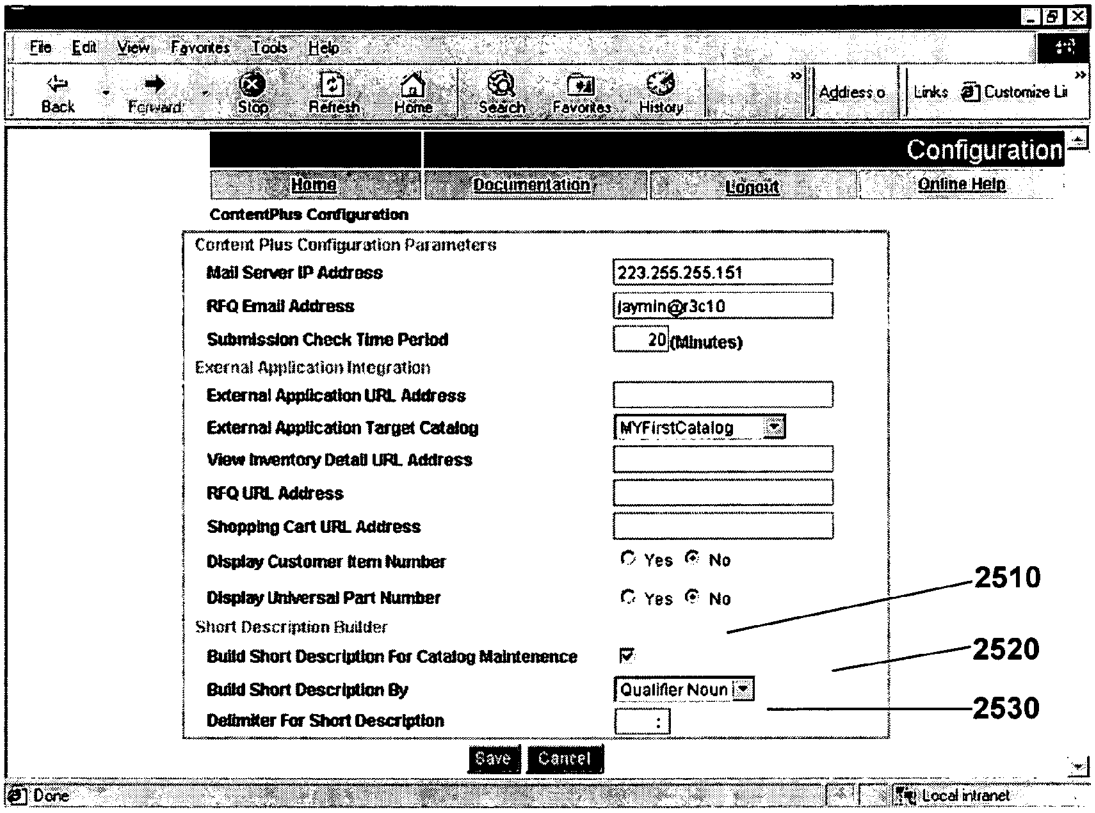
FIG. 25A illustrates how a User can set up the process for building a new short description field.

FIG. 25A illustrates a subset of this functionality. As illustrated, a User can select to build a new short description field 2510, select how the new field will be built (i.e., here, a qualifier-noun sequencing) 2520 and specify the delimiter 2530 that will be used to separate the components of the new field.

Figure 25B:
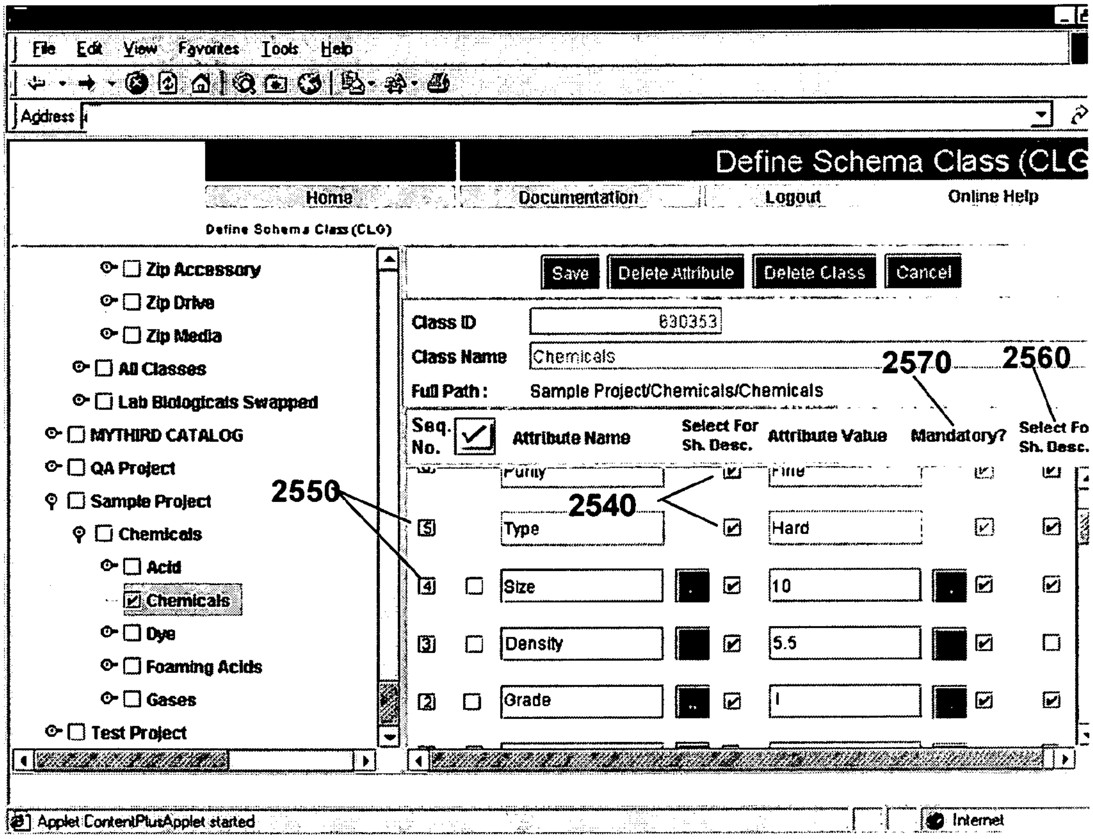
FIG. 25B illustrates how a User selects and sequences the attribute names and values to be concatenated to create the short description field.

FIG. 25B illustrates how a User selects an attribute name 2540 for the newly formed field. The User indicates the sequence in which the attribute names are to be concatenated 2550, indicates which attribute values are also to be concatenated 2560 into the new short description field, and determines which components are mandatory 2570.

Highlight Mandatory Class Attributes

Whenever an item is created, edited or in quality control, in a preferred embodiment of the present invention, mandatory attributes can be highlighted. This User-alert indicates which items are mandatory. To facilitate quality assurance, the User has the capacity to view and export Items that are Missing Attribute Values.

Figure 26A:
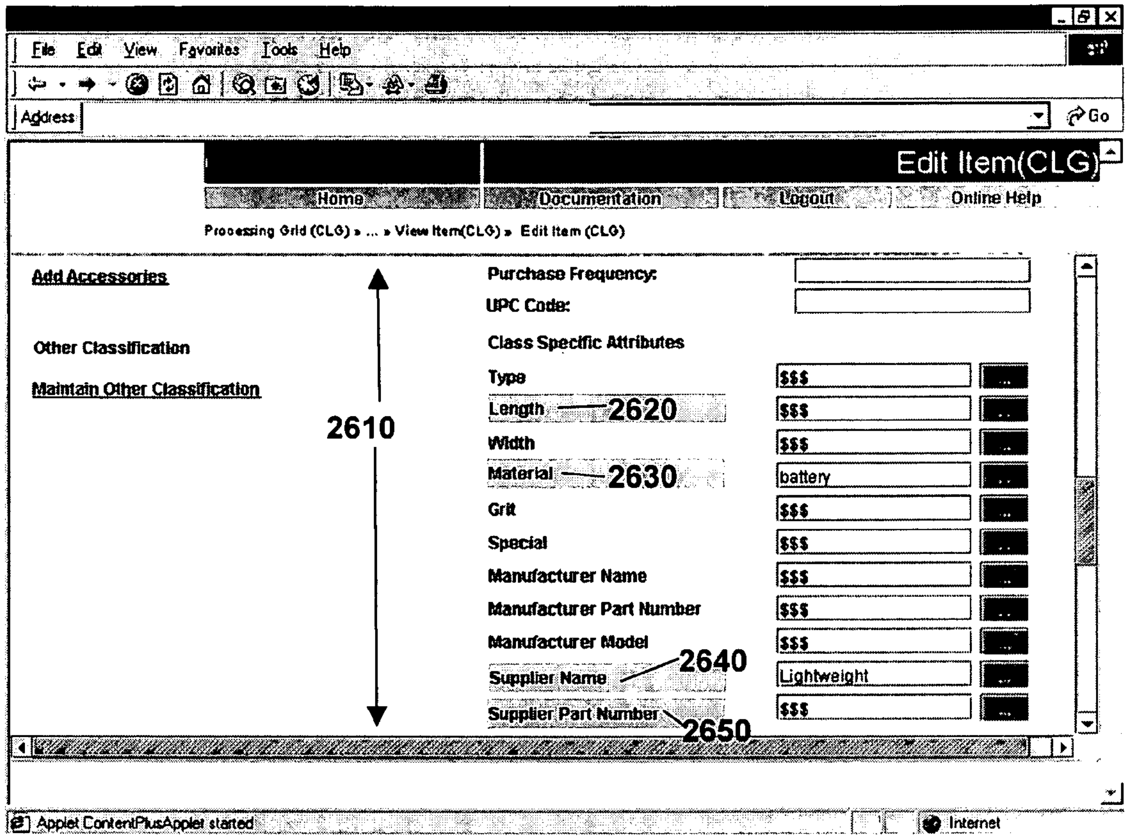
FIG. 26A illustrates a screen listing item attributes and highlighting mandatory attributes.

FIG. 26A illustrates a screen that is listing the item attributes 2610 and indicating by the highlights which fields are mandatory, i.e., length 2620, material 2630, supplier name 2640 and supplier part number 2650.

Figure 26B:
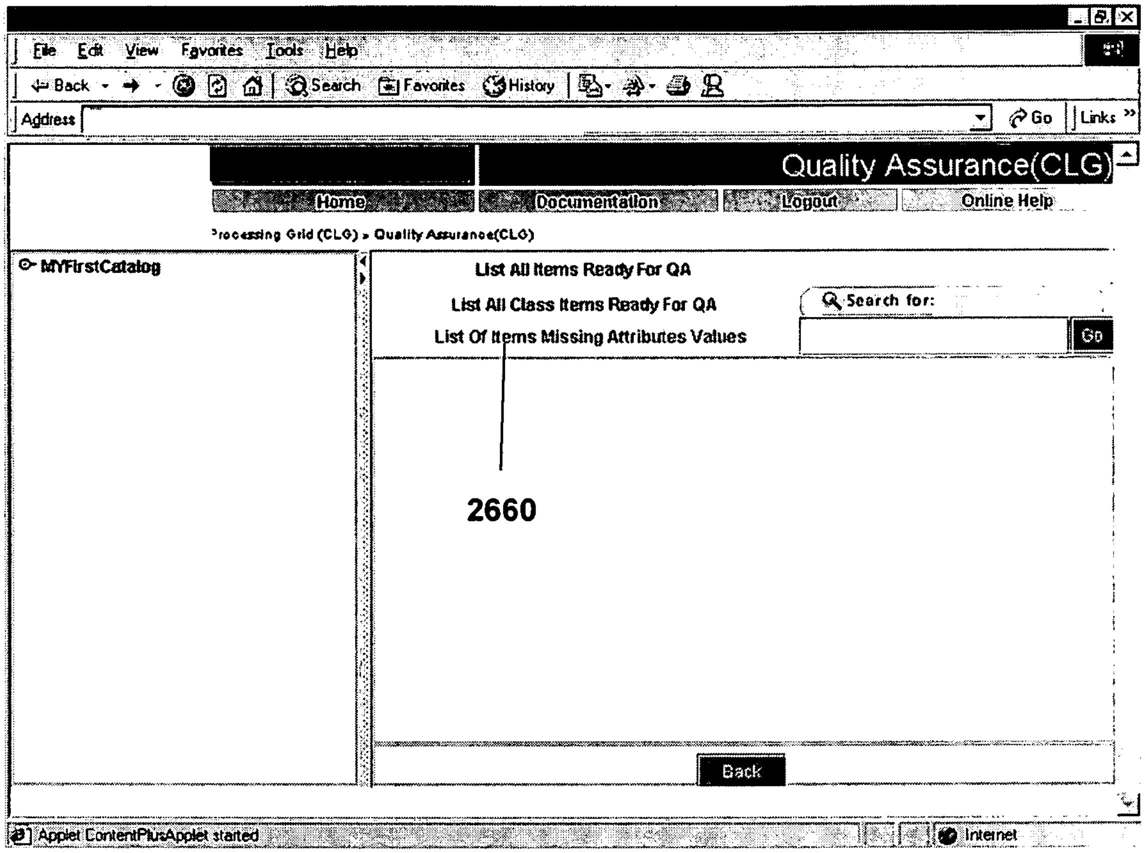
FIG. 26B illustrates a screen that lets a User request a view of items that are missing mandatory attribute values.

FIG. 26B illustrates a screen that enables the User to request a view of items that are missing mandatory attribute values 2660.

Figure 26C:
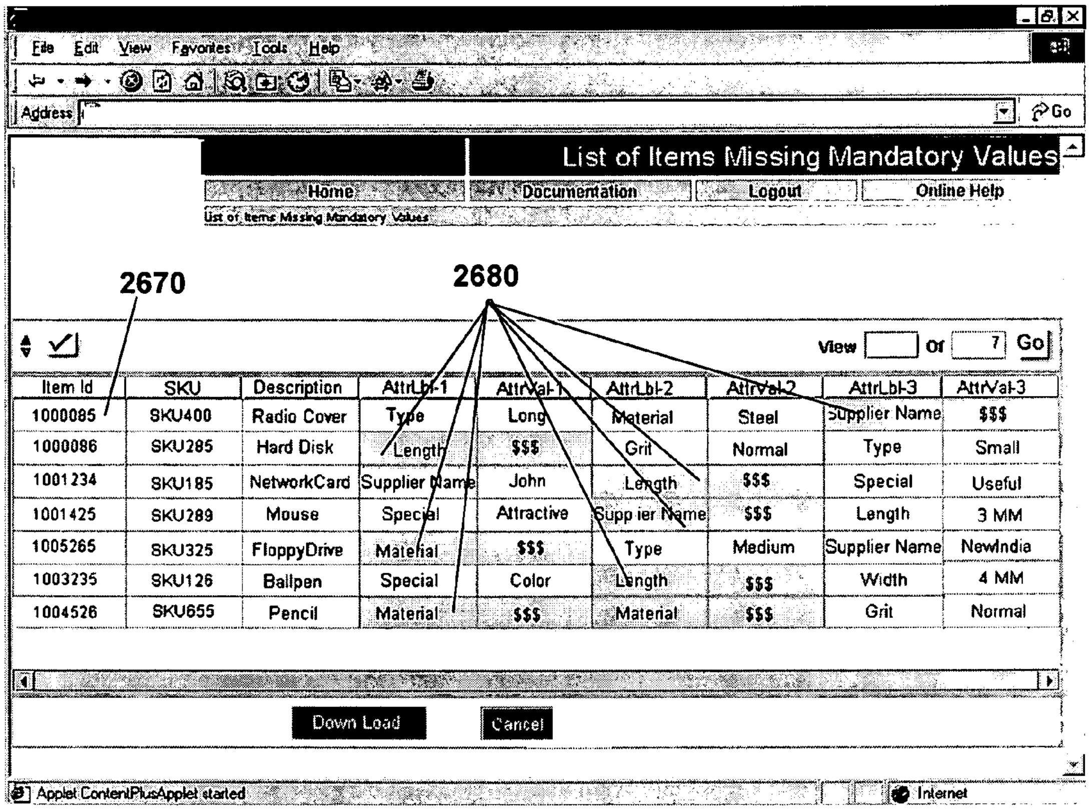
FIG. 26C illustrates a screen that lists the items missing mandatory attribute values, and highlights the missing values.

FIG. 26*c* illustrates a screen that lists the items that are missing mandatory attribute values 2670, and highlights the missing values 2680.

A Preferred System Architecture

Figure 27:
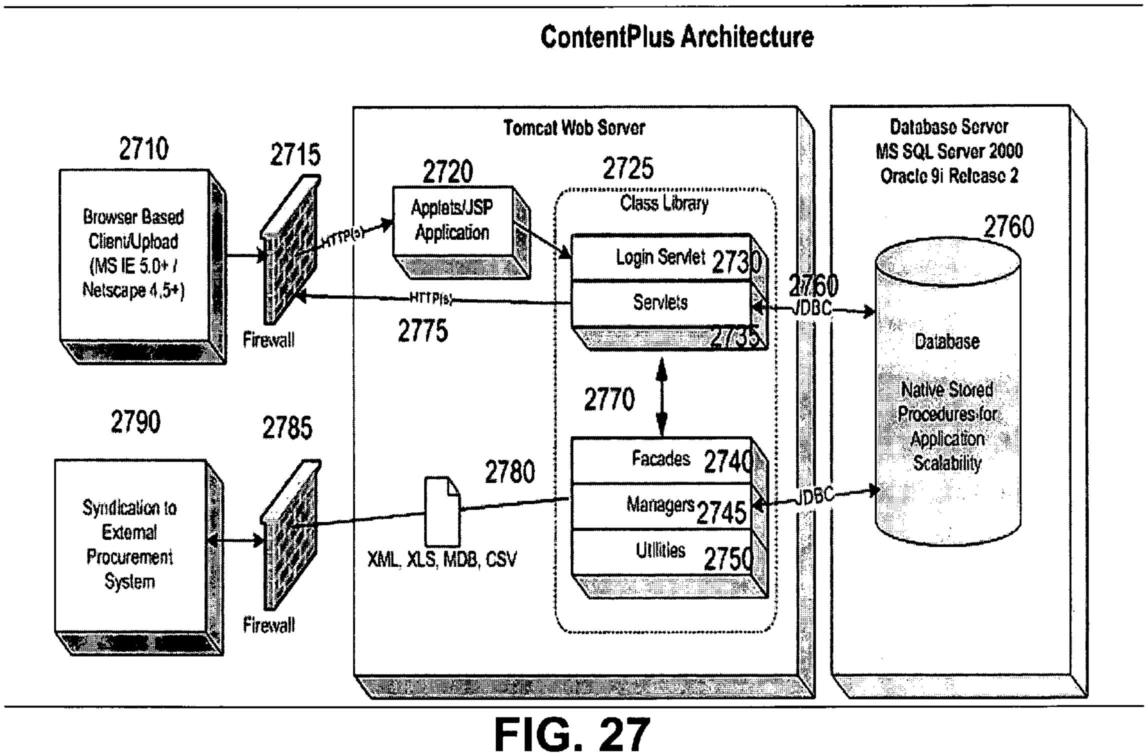
FIG. 27 illustrates an example of a preferred system architecture.

FIG. 27 illustrates an example of a 3-tier application for creating a rich-content repository, according to a preferred embodiment of the present invention.

Tier 1—Browser-Based Clients

In this tier performs the following functions are performed:

1. Clients access the system and method of the present invention using one of a Microsoft Internet Explorer 5.0+ or Netscape 4.5+ browser 2710. The access is made to a web server through firewalls 2715.

2. The applets/JSPs 2720 are downloaded from the web server onto clients. Clients are authenticated by userID and password—using a login mechanism 2730—before they access the system and method of the present invention.

Tier 2—Web Server

This tier performs the following functions:

1. Listens to incoming http request from clients— the server contains a class library 2725 that is composed of the objects;

the listening function is performed by Servlets 2735;

the Servlets handle all incoming requests and distinctly identify each incoming request; and the Servlets invoke the appropriate Façade to process that request 2740.

2. Processes each incoming request— the Façade and the appropriate Managers 2745 perform this processing;

the Façade controls the overall processing of the request and invokes one or more Managers to process the request;

Managers execute the business logic and interact, via JCDB connections 2760 with the database 2765 to query data, perform database updates and execute stored procedure;

Managers & Facades use various utilities 2750 to perform the job where utilities are common functions;

after completing the processing, the Façade—with the help of Managers—prepares data and returns it to the Servlet 2770.

3. Provide response back to client— this function is performed by Servlets and returns the data that was received from the Façade to the clients using the http protocol 2775;

the data is transferred back via in form of http response over the firewall 2715.

4. Export data for external use—the Servlets and Managers can also syndicate the export of selected data elements 2780 through a firewall 2785 to an external system 2790, which in this example is a procurement system that will utilize the rich-content.

Tier 3—Server

In this tier the database server 2765 performs the following functions—

1. maintains the rich-content data in a rich-content repository;
2. provides access to the rich-content repository for querying and performing updates;
3. manages database transactions; and
4. execute stored procedures when requested by Managers.

While examples have been disclosed they are for explanatory purposes only and should not be construed in any limiting sense. One skilled in the art will realize the present invention applies broadly to any system and method for the creation and management of rich-content life-cycles for the creation, maintenance and management of rich-content resources in whatever form they are created, e.g., e-catalogs. The scope of the present invention is to be limited only by the scope of the accompanying claims and not by any example presented to elucidate the present invention.

We claim:

1. A method for creating and managing under a User direction a rich-content repository of a plurality of items each having at least one field, comprising the steps of:

a. defining a life-cycle as an ordered sequence of at least one stage for the rich-content repository, wherein the repository is stored in a memory of a host system;

b. managing the at least one stage of the defined rich-content life-cycle; and c. providing a graphical user interface for the User to perform steps a and b, wherein step a. comprises the steps of:

a.1 providing a common language for defining a pre-determined standard schema;

a.2 defining the standard schema with the provided common language;

a.3 structuring a standard database according to the defined standard schema;

a.4 importing a content file having at least one of an incoming raw content file including an item file structure having at least one incoming item, and an incoming schema file defining the incoming raw content file;

a.5 determining at least one difference between the incoming content file and the defined standard database as a delta analysis;

a.6 value-added mapping of the imported raw content file according to the defined standard schema and the determined delta analysis; and a.7 performing at least one of the steps of publishing and syndicating the mapped content as a rich-content repository.

2. The method of claim 1, further comprising the step of:

d. linking the rich-content repository with at least one standard classification system.

3. The method of claim 2, wherein step d. further comprises the steps of:

d.1. including in each item of said plurality of items at least one User-defined field for mapping said item to the at least one standard classification system;

d.2. importing at least one external data into the at least one User-defined field;

d.3. mapping said at least one field User-defined field to at least one data field of the at least one standard classification system; and d.4. reporting said imported at least one external item when it does not meet at least one pre-defined mandatory requirement.

4. The method of claim 2, further comprising the step of:

e. formatting each item of said plurality of items according to at least one requirement of an external system.

5. The method of claim 1, wherein step b. further comprises the step of:

b.1 providing at least one User-defined function for managing the at least one stage of the defined rich-content life-cycle, said at least one User-defined function selected from the group consisting of smart field definition, hierarchical relationship definition, global change definition, pricing adaptation, collaborated hot list construction, marketplace selection, contract compliance monitoring, global level pattern matching rule definition, dynamic hot list update, exception reporting, composite data field selection, and mandatory class attribute highlighting.

6. The method of claim 1, wherein: said at least one life-cycle stage comprises at least one stage selected from the group consisting of data aggregation, data transformation, catalog administration and publishing, catalog maintenance, catalog browsing, and data syndication; and step b. further comprises the steps of b.1 arranging the at least one stage in a pre-determined order as a life-cycle, and b.2 modifying an existing life-cycle according to a new pre-determined order as a new life-cycle by performing the substeps of b.2.1 rearranging at least one stage of the existing life-cycle, b.2.2 dropping at least one stage of the existing life-cycle, and b.2.3 adding at least one stage to the existing life-cycle; and wherein the basic data associated with the rich-content repository has been upgraded, enhanced or enriched beyond a basic data state for fulfilling tasks related to the basic data.

7. The method of claim 6, wherein the data aggregation stage comprises performing the steps of importing, standardizing, and validating incoming data and at least one schema file in at least one data format from at least one data source; the data transformation stage comprises performing the steps of using and extending at least one referencing schema for enabling classification of at least one rich-content data item; the catalog administration and publishing stage comprises performing the steps of defining and maintaining at least one critical administrative information that includes a profile of at least one of a User and a User group, the authorization rules for at least one of a User and a User role, the specification of at least one security access rule, the definition of at least one markup price, the specification of at least one product view, the specification of at least one business rule such as a workflow approval routing rule; the catalog maintenance stage comprises the steps of defining and managing of at least one rich-content item in at least one already published rich-content repository by performing at least one step selection from the group consisting of modifying at least one existing item, and deleting of at least one existing item, and adding of at least one new item; the catalog browsing stage comprises the steps of browsing and navigating at least one existing rich-content repository and viewing at least one product item contained therein, and then performing one of selecting at least one item to purchase and requesting at least one quote for each non-available item; the data syndication stage comprises the steps of exporting at least one rich-content data item in at least one pre-determined format.

8. A system for providing access to at least one of a published and syndicated rich-content repository created using the method of claim 7, comprising: a host system; at least one database within said host system that stores the at least one of the published rich-content repository and the syndicated rich-content repository; a computer processor within said host system configured to access the at least one of the published rich-content repository and the syndicated rich-content repository stored on the at least one database; and a User input/output interface providing the at least one User-defined function and communicatively connected to said host system, said computer processor and said rich-content repository whereby a User interactively directs the processor to perform the at least one User-defined function to create and manage the at least one of the published rich-content repository and the syndicated rich-content repository according to a pre-defined life-cycle having at least one stage.

9. The method of claim 6, wherein step b. further comprises the step of:

b.1 providing at least one User-defined function for managing the at least one stage of the defined rich-content life-cycle, said at least one function selected from the group consisting of smart field definition, hierarchical relationship definition, global change definition, pricing adaptation, collaborated hot list construction, marketplace selection, contract compliance monitoring, global level pattern matching rule definition, dynamic hot list update, exception reporting, composite data field selection, and mandatory class attribute highlighting.

10. The method of claim 9, wherein step c. further comprises the steps of:

c.1 providing a web browser for viewing the rich-content repository and management of the life-cycle;

c.2 navigating, while viewing with the provided browser, a referencing schema of a rich-content repository to a class, said referencing schema comprising a class hierarchy including at least the class navigated to;

c.3 viewing with the provided Web browser at least one item of the rich-content repository corresponding to the class navigated to; and c.4 with the provided Web browser and the at least one User-defined function, managing the life-cycle of the at least one item of the rich-content repository corresponding to the class navigated to.

11. The method of claim 10 further comprising the step of:

e. creating a second rich-content repository from a first rich-content repository by performing the substeps of: e.1.1 selecting at least one item and a corresponding schema from the rich-content repository; e.1.2 extracting the selected at least one item and the corresponding schema using, in part, the at least one User-defined function; and e.1.2 creating the second rich-content repository from the extracted at least one item and corresponding schema using, in part, the at least one User-defined function.

12. A system for providing access to at least one of a published and syndicated rich-content repository created using the method of claim 9, comprising: a host system; at least one database within said host system that stores the at least one of the published rich-content repository and the syndicated rich-content repository; a computer processor within said host system configured to access the at least one of the published rich-content repository and the syndicated rich-content repository stored on the at least one database; and a User input/output interface providing the at least one User-defined function and communicatively connected to said host system, said computer processor and said rich-content repository whereby a User interactively directs the processor to perform the at least one User-defined function to create and manage the at least one of the published rich-content repository and the syndicated rich-content repository according to a pre-defined life-cycle having at least one stage.

13. The system of claim 12, wherein said User input/output interface is provided by at least one of a wired device and a wireless device having an interactive user interface.

14. The system of claim 13, wherein said device is communicatively connected via at least one of a wired network and a wireless network.

15. The method of claim 1, wherein step a.7 further comprises the steps of:

a.7.1 selecting a schema and at least one item to be exported for a specific customer;

a.7.2 defining a structure for the exported at least one item;

a.7.3 providing at least one User-defined syndication function; and a.7.4 syndicating the selected schema and at least one item in the defined structure with the provided at least one User-defined function.

16. A system for providing access to at least one of a published and syndicated rich-content repository created using the method of claim 1, comprising: a host system; at least one database within said host system that stores the at least one of the published rich-content repository and the syndicated rich-content repository; a computer processor within said host system configured to access the at least one of the published rich-content repository and the syndicated rich-content repository stored on the at least one database; and a User input/output interface providing the at least one User-defined function and communicatively connected to said host system, said computer processor and said rich-content repository whereby a User interactively directs the processor to perform the at least one User-defined function to create and manage the at least one of the published rich-content repository and the syndicated rich-content repository according to a pre-defined life-cycle having at least one stage.

17. A method for creating and managing under a User direction a rich-content repository of a plurality of items each having at least one field, comprising the steps of:

a. defining a life-cycle as an ordered sequence of at least one stage for the rich-content repository, wherein the repository is stored in a memory of a host system;

a.1 providing a common language for defining a pre-determined standard schema;

a.2 defining the standard schema with the provided common language;

b. managing the at least one stage of the defined rich-content life-cycle; and c. providing a graphical user interface for the User to perform steps a and b, wherein said at least one life-cycle stage comprises at least one stage selected from the group consisting of data aggregation, data transformation, catalog administration and publishing, catalog maintenance, catalog browsing, and data syndication; and step b. further comprises the steps of b.1 arranging the at least one stage in a pre-determined order as a life-cycle, and b.2 modifying an existing life-cycle according to a new pre-determined order as a new life-cycle by performing the substeps of b.2.1 rearranging at least one stage of the existing life-cycle, b.2.2 dropping at least one stage of the existing life-cycle, and b.2.3 adding at least one stage to the existing life-cycle;

wherein step b. further comprises the step of:

b.3 providing at least one User-defined function for managing the at least one stage of the defined rich-content life-cycle, said at least one function selected from the group consisting of smart field definition, hierarchical relationship definition, global change definition, pricing adaption, collaborated host list construction, marketplace selection, contract compliance monitoring, global level pattern matching rule definition, dynamic hot list update, exception reporting, composite data field selection, and mandatory class attribute highlighting; wherein step c. further comprises the step of:

c.1 providing a web browser for viewing the rich-content repository and management of the life-cycle;

c.2 navigating, while viewing with the provided browser, a referencing schema of a rich-content repository to a class, said referencing schema comprising a class hierarchy including at least the class navigated to;

c.3 viewing with the provided Web browser at least one item of the rich-content repository corresponding to the class navigated to; and c.4 with the provided Web browser and the at least one User-defined function, managing the life-cycle of the at least one item on the rich-content repository corresponding to the class navigated to, wherein: step a.2 further comprises the step of:

a.2.1, defining the standard schema as a tree-structured schema of a plurality of schema classes each having at least one item having at least one attribute; and further comprising the steps of:

e. copying said at least one item of a first schema class of said plurality to said at least one item of a second schema class of said plurality;

f. reflecting changes in an item in every schema class having the item;

g. defining, modifying, and deleting a default attribute value for an attribute and a global pattern for an attribute;

h. defining, modifying and deleting information for at least one of a User, a User group, a product view, a shopper group, a quantity-based discount, a promotional price, and a price markup;

i. providing at least one User-defined function for management of the rich-content life-cycle; and j. managing and administering the at least one stage of the defined rich-content life-cycle of the rich-content repository with the provided at least one User-defined function.

18. The method of claim 17, wherein the defining step a.2.1 further comprises the step of: a.2.1.1 including a manufacturer specification in an item definition, said definition comprising at least one logo and an indicator that the at least one logo is to be displayed whenever the manufacturer is displayed.

19. A system for providing access to at least one of a published and syndicated rich-content repository created using the method of claim 17, comprising: a host system; at least one database within said host system that stores the at least one of the published rich-content repository and the syndicated rich-content repository; a computer processor within said host system configured to access the at least one of the published rich-content repository and the syndicated rich-content repository stored on the at least one database; and a User input/output interface providing the at least one User-defined function and communicatively connected to said host system, said computer processor and said rich-content repository whereby a User interactively directs the processor to perform the at least one User-defined function to create and manage the at least one of the published rich-content repository and the syndicated rich-content repository according to a pre-defined life-cycle having at least one stage.

* * * * *